US012604226B2

(12) United States Patent
Tao et al.

(10) Patent No.: US 12,604,226 B2
(45) Date of Patent: *Apr. 14, 2026

(54) USER EQUIPMENT INVOLVED IN MONITORING A DOWNLINK CONTROL CHANNEL

(71) Applicant: Panasonic Intellectual Property Corporation of America, Torrance, CA (US)

(72) Inventors: Ming-Hung Tao, Frankfurt am Main (DE); Hidetoshi Suzuki, Kanagawa (JP); Rikin Shah, Langen (DE); Madhav Gupta, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/068,799

(22) Filed: Mar. 3, 2025

(65) Prior Publication Data

US 2025/0203418 A1 Jun. 19, 2025

Related U.S. Application Data

(63) Continuation of application No. 18/652,627, filed on May 1, 2024, now Pat. No. 12,273,754, which is a
(Continued)

(30) Foreign Application Priority Data

May 2, 2019 (EP) .................................... 19172382

(51) Int. Cl.
*H04W 24/08* (2009.01)
*H04W 68/00* (2009.01)
(Continued)

(52) U.S. Cl.
CPC ......... *H04W 24/08* (2013.01); *H04W 68/005* (2013.01); *H04W 72/23* (2023.01);
(Continued)

(58) Field of Classification Search
CPC ... H04W 24/08; H04W 68/005; H04W 72/23; H04W 74/0841; H04W 74/0866;
(Continued)

(56) References Cited

U.S. PATENT DOCUMENTS

2018/0049006 A1* 2/2018 Hong ...................... H04L 67/60
2020/0275408 A1* 8/2020 Radulescu ............ H04L 5/0053
2020/0344718 A1* 10/2020 Ozturk .............. H04W 74/0808

FOREIGN PATENT DOCUMENTS

EP 3934155 B1 2/2023

OTHER PUBLICATIONS

U.S. Appl. No. 62/839,576, filed Apr. 26, 2019 (Year: 2019).*
(Continued)

*Primary Examiner* — Sun Jong Kim
(74) *Attorney, Agent, or Firm* — Seed Intellectual Property Law Group LLP

(57) ABSTRACT

A user equipment (UE) comprises processing circuitry which operates a function that involves monitoring of a downlink control channel of an unlicensed radio cell for information intended to the UE. The unlicensed radio cell operates in an unlicensed spectrum and is controlled by a base station. The processing circuitry and a receiver perform the monitoring of the downlink control channel based on a first timer and a second timer operated in parallel. The first timer is used to limit the maximum time the downlink control channel is to be monitored, by starting the first timer at the beginning of the monitoring and stopping the monitoring upon expiry of the first timer. The second timer is used to stop the monitoring earlier than the first timer depending
(Continued)

on the channel occupation status of the unlicensed spectrum by the base station.

7 Claims, 10 Drawing Sheets

Related U.S. Application Data continuation of application No. 17/603,851, filed as application No. PCT/EP2020/060549 on Apr. 15, 2020, now Pat. No. 12,015,943.

(51) Int. Cl.

| | |
|---|---|
| *H04W 72/23* | (2023.01) |
| *H04W 74/08* | (2024.01) |
| *H04W 74/0833* | (2024.01) |
| *H04W 76/28* | (2018.01) |

(52) U.S. Cl.
CPC ... *H04W 74/0841* (2013.01); *H04W 74/0866* (2013.01); *H04W 76/28* (2018.02)

(58) Field of Classification Search
CPC ............... H04W 76/28; H04W 74/006; H04W 74/0808; H04L 5/0053; H04L 5/0091; H04L 27/0006; H04L 69/28; Y02D 30/70
See application file for complete search history.

(56) References Cited

OTHER PUBLICATIONS

U.S. Appl. No. 62/830,282, filed Apr. 5, 2019 (Year: 2019).*
Substantive Examination Report and Search Report, dated Feb. 26, 2025, for corresponding Malaysian Application No. PI2021006251, 4 pages.

* cited by examiner

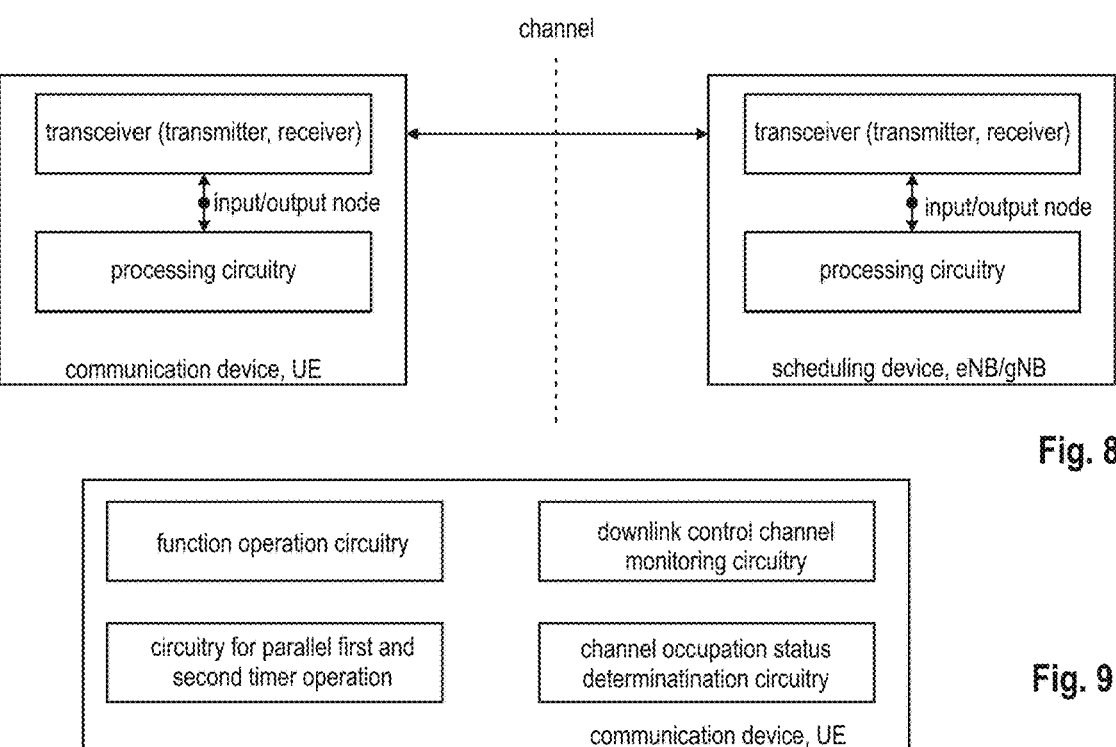
Fig. 8
Fig. 9
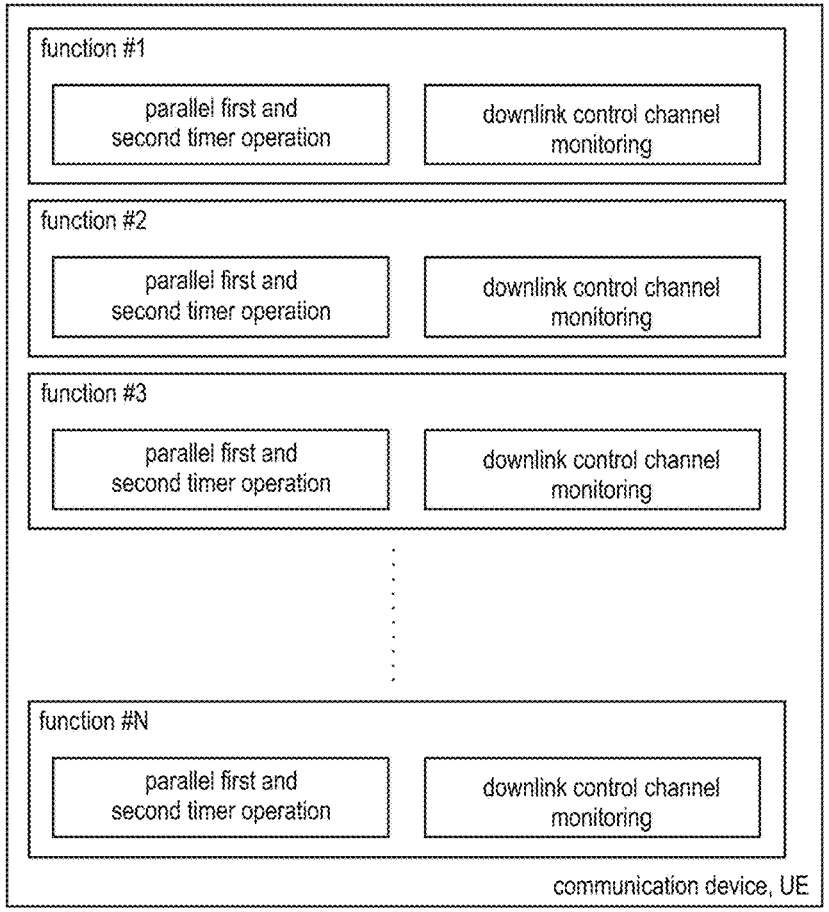
Fig. 10

USER EQUIPMENT INVOLVED IN MONITORING A DOWNLINK CONTROL CHANNEL

BACKGROUND

Technical Field

The present disclosure is directed to methods, devices and articles in communication systems, such as 3GPP communication systems.

Description of the Related Art

Currently, the 3rd Generation Partnership Project (3GPP) works at the technical specifications for the next generation cellular technology, which is also called fifth generation (5G).

One objective is to provide a single technical framework addressing all usage scenarios, requirements and deployment scenarios (see, e.g., section 6 of TR 38.913 version 15.0.0), at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC deployment scenarios may include scenarios with large number of devices with non-time critical data transfers such as smart wearables and sensor networks. The services eMBB and URLLC are similar in that they both demand a very broad bandwidth, however are different in that the URLLC service may preferably require ultra-low latencies.

A second objective is to achieve forward compatibility. Backward compatibility to Long Term Evolution (LTE, LTE-A) cellular systems is not required, which facilitates a completely new system design and/or the introduction of novel features.

BRIEF SUMMARY

One non-limiting and exemplary embodiment facilitates providing improved procedures for monitoring a downlink control channel.

In an embodiment, the techniques disclosed here feature a user equipment comprising processing circuitry, which in operation, operates a function that involves monitoring of a downlink control channel of an unlicensed radio cell for information intended to the UE, the unlicensed radio cell operating in an unlicensed spectrum and being controlled by a base station that is in communication with the user equipment. The processing circuitry and a receiver perform the monitoring of the downlink control channel based on a first timer and a second timer operated in parallel. The first timer is used to limit the maximum time the downlink control channel is to be monitored, by starting the first timer at the beginning of the monitoring of the downlink control channel and stopping the monitoring of the downlink control channel upon expiry of the first timer. The second timer is used to stop the monitoring of the downlink control channel earlier than the first timer depending on the channel occupation status of the unlicensed spectrum of the radio cell by the base station.

It should be noted that general or specific embodiments may be implemented as a system, a method, an integrated circuit, a computer program, a storage medium, or any selective combination thereof.

Additional benefits and advantages of the disclosed embodiments and different implementations will be apparent from the specification and figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE FIGURES

In the following exemplary embodiments are described in more detail with reference to the attached figures and drawings.

FIG. 8 illustrates the exemplary and simplified structure of a UE and a gNB;

FIG. 9 illustrates a structure of the UE according to an exemplary implementation of an improved downlink control channel monitoring procedure;

FIG. 10 illustrates various functions to be operated in a UE, and the involved parallel operation of two timers and the downlink control channel monitoring;

DETAILED DESCRIPTION

5G NR System Architecture and Protocol Stacks

3GPP has been working at the next release for the 5$^{th}$ generation cellular technology, simply called 5G, including the development of a new radio access technology (NR) operating in frequencies ranging up to 100 GHz. The first version of the 5G standard was completed at the end of 2017, which allowed proceeding to 5G NR standard-compliant trials and commercial deployments of smartphones.

Figure 1:
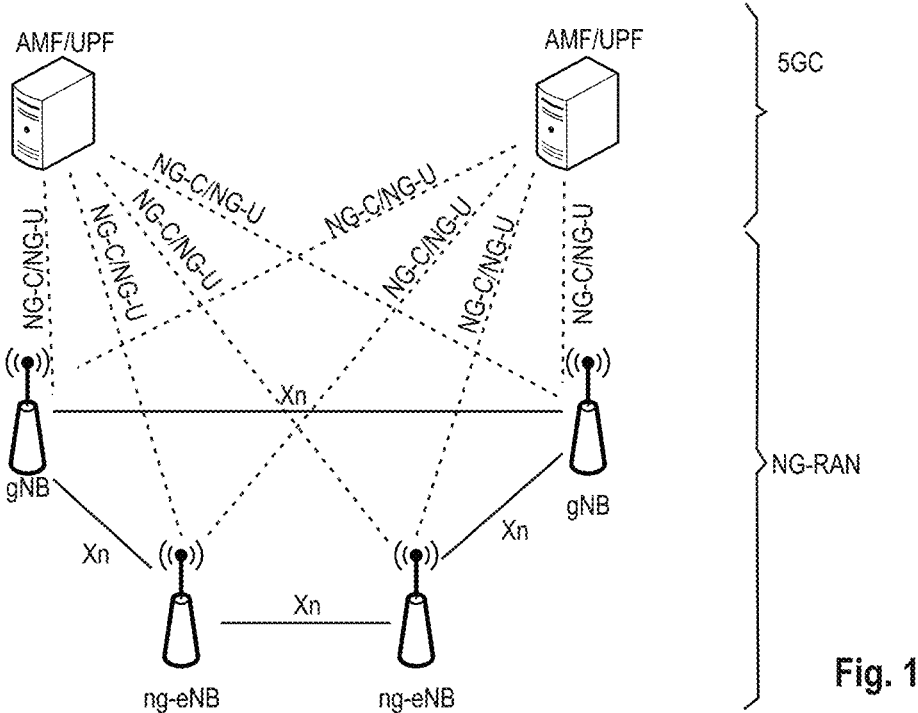
FIG. 1 shows an exemplary architecture for a 3GPP NR system.

Among other things, the overall system architecture assumes an NG-RAN (Next Generation-Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.5.0, section 4).

Figure 2:
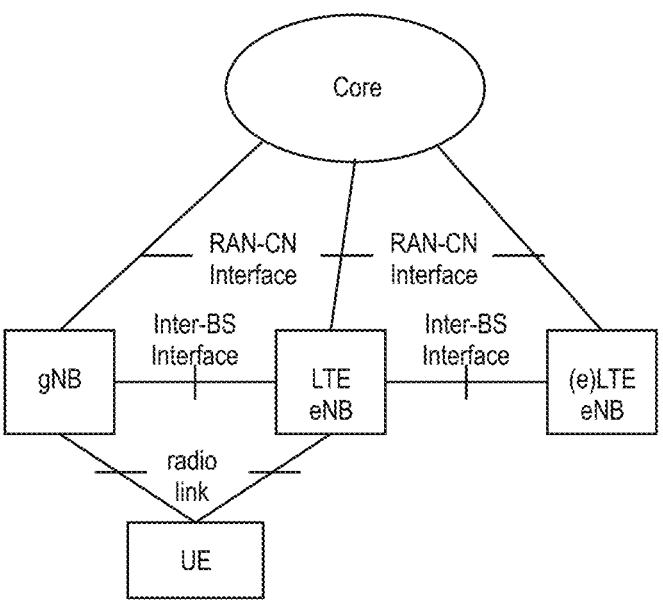
FIG. 2 shows an exemplary user and control plane architecture for the LTE eNB, gNB, and UE.

Various different deployment scenarios can be supported (see, e.g., 3GPP TR 38.801 v14.0.0). For instance, a non-centralized deployment scenario (see, e.g., section 5.2 of TR 38.801; a centralized deployment is illustrated in section 5.4) is presented therein, where base stations supporting the 5G NR can be deployed. FIG. 2 illustrates an exemplary non-centralized deployment scenario (see, e.g., FIG. 5.2.-1 of said TR 38.801), while additionally illustrating an LTE eNB as well as a user equipment (UE) that is connected to both a gNB and an LTE eNB. The new eNB for NR 5G may be exemplarily called gNB. An eLTE eNB is the evolution of an eNB that supports connectivity to the EPC (Evolved Packet Core) and the NGC (Next Generation Core).

The user plane protocol stack for NR (see, e.g., 3GPP TS 38.300 v15.5.0, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

For the physical layer, the MAC layer uses services in the form of transport channels. A transport channel can be defined by how and with what characteristics the information is transmitted over the radio interface. The Random-Access Channel (RACH) is also defined as a transport channel handled by MAC, although it does not carry transport blocks. One of procedures supported by the MAC layer is the Random Access Procedure.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. One physical channel is the PRACH (Physical Random Access Channel) used for the random access.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10$^{-5}$ within 1 ms). Finally, mMTC may preferably require high connection density (1,000,000 devices/km$^2$ in an urban environment), large coverage in harsh environments, and extremely long-life battery for low cost devices (15 years). Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration T$_u$ and the subcarrier spacing Δf are directly related through the formula Δf=1/T$_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.5.0).

Downlink Control Channel Monitoring, PDCCH, DCI

Many of the functions operated by the UE involve the monitoring of a downlink control channel (e.g., the PDCCH, see 3GP TS 38.300 v15.5.0, section 5.2.3) to receive, e.g., particular control information or data destined to the UE.

A non-exhaustive list of these functions is given in the following:

a paging message monitoring function,
a system information acquisition function, signaling monitoring operation for a Discontinued Reception, DRX, function, inactivity monitoring operation for a Discontinued Reception, DRX, function, random access response reception for a random access function, reordering function of a Packet Data Convergence Protocol, PDCP, layer.

The present description will focus on the above list of functions. However, the concepts and aspects for improving the PDCCH monitoring described herein are also applicable to other functions that involve PDCCH monitoring.

As mentioned above, the PDCCH monitoring is done by the UE so as to identify and receive information intended for the UE, such as the control information as well as the user traffic (e.g., the DCI on the PDCCH, and the user data on the PDSCH indicated by the PDCCH).

Control information in the downlink (termed downlink control information, DCI) has the same purpose in 5G NR as the DCI in LTE, namely being a special set of control information that, e.g., schedules a downlink data channel (e.g., the PDSCH) or an uplink data channel (e.g., PUSCH). In 5G NR there are a number of different DCI Formats defined already (see TS 38.212 v15.5.0 section 7.3.1).

The PDCCH monitoring of each of these functions serves a particular purpose and is thus started to said end. The PDCCH monitoring is typically controlled at least based on a timer, operated by the UE. The timer has the purpose of controlling the PDCCH monitoring, e.g., limiting the maximum amount of time that the UE is to monitor the PDCCH. For instance, the UE may not need to indefinitely monitor the PDCCH, but may stop the monitoring after some time so as to be able to save power. Correspondingly, a timer may be started when the UE starts the PDCCH monitoring for the intended purpose. Then, when the timer expires, the UE may stop the PDCCH monitoring for the intended purpose, and has the opportunity to save power.

The above listed functions will be described respectively in more detail in the following.

Paging Procedures in 5G NR

An exemplary implementation of the paging function in 5G NR that involves PDCCH monitoring, according to the currently standardized version, will be explained in a simplified and abbreviated form in the following.

There are two different paging procedures in 5G NR, a RAN-based paging procedure (e.g., based on RAN-based notification areas) and a core-network-based paging procedure (see for instance 3GPP TS 38.300 v15.5.0, TS 38.304 v15.3.0, and TS 38.331 v15.5.0 referring to RAN paging and CN paging in several sections thereof, such as section 9.2.5 "Paging" in TS 38.300).

Paging allows the network to reach UEs in RRC_IDLE and RRC_INACTIVE state through Paging messages, and to notify UEs in RRC_IDLE, RRC_INACTIVE, and RRC_CONNECTED state of system information change and ETWS/CMAS (Earthquake and Tsunami Warning System/Commercial Mobile Alert System) indications through Short Messages. Both the paging messages and the Short Messages are addressed with P-RNTI on the PDCCH to be monitored by the UE. But while the actual paging messages (e.g., with the paging records) are then sent on PCCH (as indicated by the PDCCH), the Short Messages can be sent over PDCCH directly.

While in RRC_IDLE the UE monitors the paging channels for CN-initiated paging, in RRC_INACTIVE the UE also monitors paging channels for RAN-initiated paging. A UE need not monitor paging channels continuously though;

Paging DRX is defined where the UE in RRC_IDLE or RRC_INACTIVE is only required to monitor paging channels during one Paging Occasion (PO) per DRX cycle (see 3GPP TS 38.304 v15.3.0, e.g., sections 6.1 and 7.1). The Paging DRX cycles are configured by the network.

The POs of a UE for CN-initiated and RAN-initiated paging are based on the same UE ID, resulting in overlapping POs for both. The number of different POs in a DRX cycle is configurable via system information, and a network may distribute UEs to those POs based on their IDs. A PO is a set of PDCCH monitoring occasions and can consist of multiple time slots (e.g., subframe or OFDM symbol) where paging DCI can be sent. One Paging Frame (PF) is one Radio Frame and may contain one or multiple PO(s) or starting point of a PO.

When in RRC_CONNECTED, the UE monitors the paging channels in any PO signaled in system information for SI change indication and PWS (Public Warning System) notification. In case of Bandwidth Adaptation (BA) (see section 6.10 in TS 38.300), a UE in RRC_CONNECTED only monitors paging channels on the active BWP with common search space configured.

To summarize the above within the context of the improved concepts and aspects for the PDCCH monitoring as will be explained later, in order to control the PDCCH monitoring for the paging function, the UE may use a timer, e.g., counting the time length of the paging occasion. For instance, the timer is started at the beginning of the PO until the timer (with the length of the PO as timer value) expires.

When the UE receives a paging message, the PDCCH monitoring can be stopped by the UE. Depending on the paging cause, the UE may continue with, e.g., obtaining system information, or establishing the RRC connection with the base station and then receiving the traffic/instruction from the network.

NR System Information Acquisition

An exemplary implementation of the system information acquisition function in 5G NR that involves PDCCH monitoring, according to the currently standardized version, will be explained in a simplified and abbreviated form in the following.

In 5G NR, system information (SI) is divided into the MIB (Master Information Block) and a number of SIBs (System Information Blocks) (see 3GPP TS 38.331 v15.5.1, e.g., section 5.2, see also 3GPP TS 38.300 v15.5.0, e.g., section 7.3, and also 3GPP TS 38.213, e.g., section 13). The MIB is transmitted on the BCH and includes parameters that are needed to acquire the SIB1 from the cell. The SIB1 is periodically transmitted on the DL-SCH and includes information regarding the availability and scheduling, e.g., mapping of SIBs to SI messages, periodicity, SI-window size of other SIBs with an indication whether one or more SIBs are only provided on demand, and in that case, the configuration needed by the UE to perform the SI request.

SIBs other than SIB1 are carried in System Information messages (SI messages), which are transmitted on the DL-SCH. SIBs having the same periodicity can be mapped to the same SI message. Each SI message is transmitted within periodically occurring time-domain windows (referred to as SI-windows with the same length for all SI messages). Each SI message is associated with an SI-window, and the SI-windows of different SI messages do not overlap.

The UE applies the SI acquisition procedure to acquire the information of the Access Stratum (AS) and Non-Access stratum (NAS), and applies to UEs in RRC_IDLE, in RRC_INACTIVE, and in RRC_CONNECTED modes. For instance, the UE may apply the SI acquisition procedure upon cell selection (e.g., upon power-on), cell-reselection, return from out of coverage, after reconfiguration with sync completion, after entering the network from another RAT (Radio Access Technology), upon receiving an indication that the system information has changed, and when the UE does not have a valid version of a stored SIB. A modification period is used, e.g., updated SI is broadcast in the modification period following the one whether the SI change indication is transmitted.

The UE receives indications about the SI modifications using a Short Message transmitted with the P-RNTI over DCI. UEs in RRC_IDLE or in RRC_INACTIVE may monitor for an SI change indication in its own paging occasion every DRX cycle (see above). UEs in RRC_CONNECTED shall monitor for an SI change indication in any paging occasion at least once per modification period.

For SI message acquisition one or more PDCCH monitoring occasions are determined, which can be the same or different than for PDCCH monitoring of SIB1. For instance, the UE assumes that, in the SI window, PDCCH for an SI message is transmitted in at least one PDCCH monitoring occasion corresponding to each transmitted SSB (Synchronization Signal Block). The SIB1 configuration provides information about the search space and other PDCCH-related parameters that a UE needs in order to monitor for scheduling of the SIB1.

To summarize the above within the context of the improved concepts and aspects for the PDCCH monitoring as will be explained later, the UE may use a timer to control the SI-Window length, and the UE may monitor the PDCCH until it successfully receives the SI message or until the end of the SI-Window with a specific length. If the SI message was not received by the end of the SI-window, monitoring of the PDCCH can be repeated at the next SI-Window occasion for the concerned SI message in the current modification period.

Discontinued Reception, DRX, in LTE and 5G NR

An exemplary implementation of the discontinued reception (DRX) function in 5G NR that involves PDCCH monitoring, according to the currently standardized version, will be explained in a simplified and abbreviated form in the following.

To reduce the battery consumption in the UE, a mechanism to minimize the time the UE spends monitoring the PDCCH is used, which is called the Discontinuous Reception (DRX) functionality. DRX functionality can be configured for RRC_IDLE, in which case the UE uses either the specific or default DRX value (defaultPagingCycle); the default is broadcasted in the System Information and can have values of 32, 64, 128 and 256 radio frames. The UE needs to wake up for one paging occasion per DRX cycle, the paging occasion being one subframe. DRX functionality can be also configured for an "RRC_CONNECTED" UE, so that it does not always need to monitor the downlink control channels for downlink control information (or phrased simply: the UE monitors the PDCCH) (see 3GPP Technical Standard TS 36.321, 15.5.0, chapter 5.7).

The following parameters are available to define the DRX UE behavior; e.g., the On-Duration periods at which the mobile node is active (e.g., in DRX Active Time), and the periods where the mobile node is in DRX (e.g., not in DRX Active Time).

On-duration: duration in downlink subframes, e.g., more in particular in subframes with PDCCH (also referred to as PDCCH subframe), that the user equipment, after waking up from DRX, receives and monitors the PDCCH. It should be noted here that the term "PDCCH" refers to the PDCCH, EPDCCH (in subframes when configured) or, for a relay node with R-PDCCH configured and not suspended, to the R-PDCCH. If the user equipment successfully decodes a PDCCH, the user equipment stays awake/active and starts the inactivity timer; [1-200 subframes; 16 steps: 1-6, 10-60, 80, 100, 200]

DRX inactivity timer: duration in downlink subframes that the user equipment waits to successfully decode a PDCCH, from the last successful decoding of a PDCCH; when the UE fails to decode a PDCCH during this period, it re-enters DRX. The user equipment shall restart the inactivity timer following a single successful decoding of a PDCCH for a first transmission only (e.g., not for retransmissions). [1-2560 subframes; 22 steps, 10 spares: 1-6, 8, 10-60, 80, 100-300, 500, 750, 1280, 1920, 2560]

DRX Retransmission timer: specifies the number of consecutive PDCCH subframes where a downlink retransmission is expected by the UE after the first available retransmission time. [1-33 subframes, 8 steps: 1, 2, 4, 6, 8, 16, 24, 33]

DRX short cycle: specifies the periodic repetition of the on-duration followed by a possible period of inactivity for the short DRX cycle. This parameter is optional. [2-640 subframes; 16 steps: 2, 5, 8, 10, 16, 20, 32, 40, 64, 80, 128, 160, 256, 320, 512, 640]

DRX short cycle timer: specifies the number of consecutive subframes the UE follows the short DRX cycle after the DRX Inactivity Timer has expired. This parameter is optional. [1-16 subframes]

Long DRX Cycle Start offset: specifies the periodic repetition of the on-duration followed by a possible period of inactivity for the DRX long cycle as well as an offset in subframes when on-duration starts (determined by formula defined in TS 36.321 section 5.7); [cycle length 10-2560 subframes; 16 steps: 10, 20, 30, 32, 40, 64, 80, 128, 160, 256, 320, 512, 640, 1024, 1280, 2048, 2560; offset is an integer between [0-subframe length of chosen cycle]]

The total duration that the UE is awake is called "Active time" or DRX Active Time. The Active Time, e.g., includes the on-duration of the DRX cycle, the time UE is performing continuous reception while the inactivity timer has not expired and the time UE is performing continuous reception while waiting for a downlink retransmission after one HARQ RTT. Similarly, for the uplink the UE is awake (e.g., in DRX Active Time) at subframes where uplink retransmission grants can be received over the PDCCH, e.g., every 8 ms after an initial uplink transmission until the maximum number of retransmissions is reached. Based on the above, the minimum Active Time is of fixed length equal to on-duration, and the maximum is variable depending on, e.g., the PDCCH activity.

The "DRX period" or "DRX off period" is the duration of downlink subframes during which a UE can skip reception of downlink channels for battery saving purposes, e.g., is not required to monitor the downlink channels. The operation of DRX gives the mobile terminal the opportunity to deactivate the radio circuits repeatedly (according to the currently active DRX cycle) in order to save power. Whether the UE indeed remains in DRX (e.g., is not active) during the DRX period may be decided by the UE; for example, the UE usually performs inter-frequency measurements which cannot be conducted during the On-Duration, and thus need to be performed at some other time, e.g., during the DRX off time.

To meet conflicting requirements, two DRX cycles—a short cycle and a long cycle—can be configured for each UE; the short DRX cycle is optional, e.g., only the long DRX cycle could be used. The transition between the short DRX cycle, the long DRX cycle and continuous reception is controlled either by a timer or by explicit commands from the eNodeB. In some sense, the short DRX cycle can be considered as a confirmation period in case a late packet arrives, before the UE enters the long DRX cycle. If data arrives at the eNodeB while the UE is in the short DRX cycle, the data is scheduled for transmission at the next on-duration time, and the UE then resumes continuous reception. On the other hand, if no data arrives at the eNodeB during the short DRX cycle, the UE enters the long DRX cycle, assuming that the packet activity is finished for the time being.

During the Active Time, the UE monitors the PDCCH, reports SRS (Sounding Reference Signal) as configured and reports CQI (Channel Quality Information)/PMI (Precoding Matrix Indicator)/RI (Rank Indicator)/PTI (Precoder Type Indication) on PUCCH. When UE is not in Active time, type-0-triggered SRS and CQI/PMI/RI/PTI on PUCCH may not be reported. If CQI masking is set up for the UE, the reporting of CQI/PMI/RI/PTI on PUCCH is limited to the On-Duration subframes.

Figures 3, 4, 5:
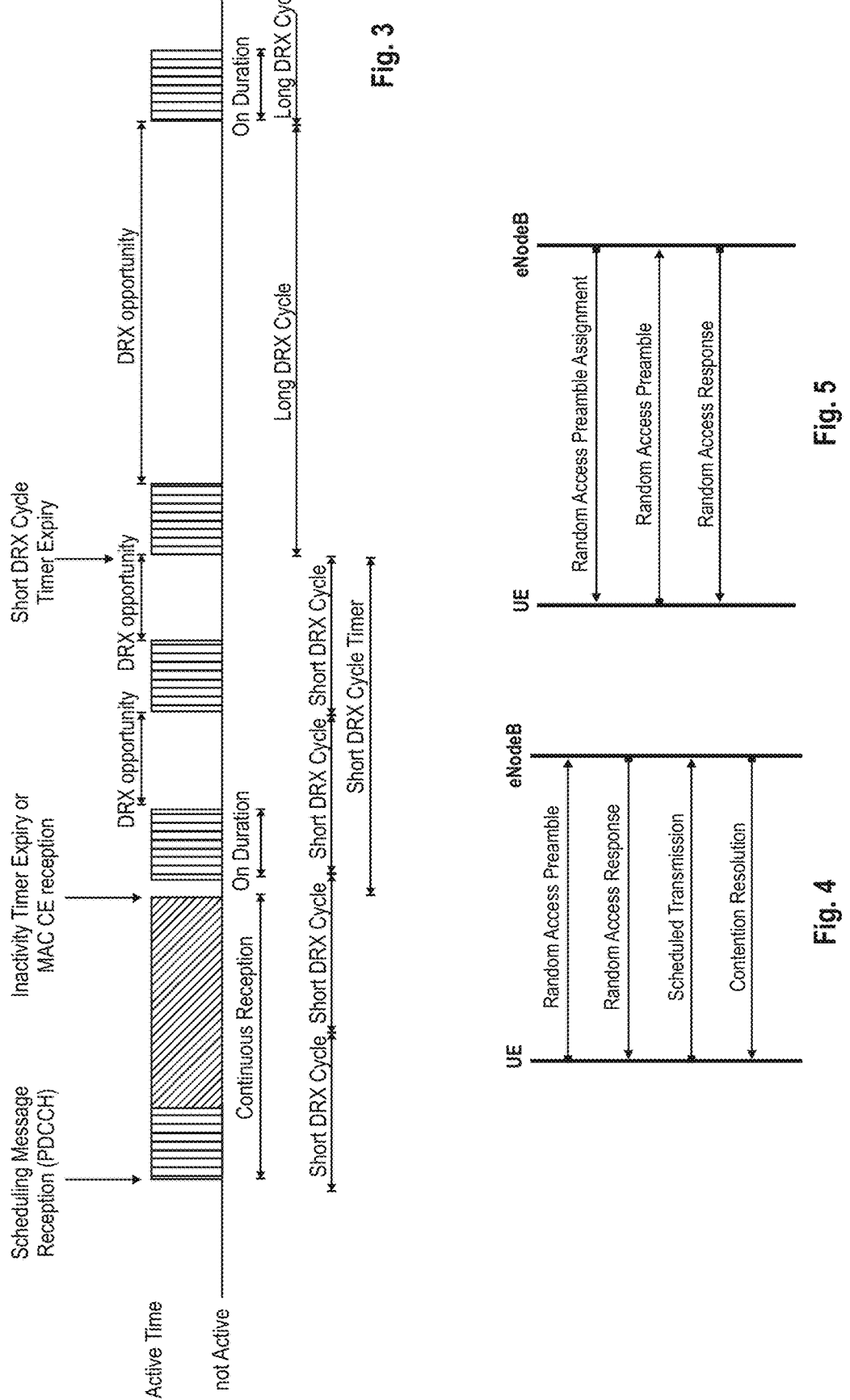
FIG. 3 illustrates the DRX operation of a mobile terminal, and in particular the DRX opportunity and on-duration periods, according to a short and long DRX cycle.
FIG. 4 illustrates the messages exchanged between an eNB and a UE when performing a contention-based RACH procedure.
FIG. 5 illustrates the messages exchanged between an eNB and a UE when performing a contention-free RACH procedure.

FIG. 3 discloses an example of a DRX operation. The UE checks for scheduling messages (can also be termed downlink/uplink assignment; e.g., indicated by its C-RNTI, cell radio network temporary identity, on the PDCCH) during the "on-duration" period, which is the same for the long DRX cycle and the short DRX cycle. When a scheduling message is received during an "on-duration period," the UE starts an "inactivity timer" and keeps monitoring the PDCCH in every subframe while the Inactivity Timer is running. During this period, the UE can be regarded as being in a "continuous reception mode.". Whenever a scheduling message is received while the Inactivity Timer is running, the UE restarts the Inactivity Timer, and when it expires the UE moves into a short DRX cycle and starts a "short DRX cycle timer" (assuming a short DRX cycle is configured). When the short DRX cycle timer expires, the UE moves into a long DRX cycle. The short DRX cycle may also be initiated by means of a DRX MAC Control Element, which the eNB can send at any time to put the UE immediately into a DRX cycle, e.g., the short DRX cycle (if so configured) or long DRX cycle (in case the short DRX cycle is not configured).

The basic concepts for DRX as explained above for LTE also apply to the new 5G NR, with some differences. The standardization has progressed and defined DRX (see 3GPP TS 38.321 v15.5.0 section 5.7 titled "Discontinuous Reception (DRX)").

The following is mentioned in TS 38.321:

RRC controls DRX operation by configuring the following parameters:

drx-onDurationTimer: the duration at the beginning of a DRX Cycle;

drx-SlotOffset: the delay before starting the drx-onDurationTimer;

drx-StartOffset: the subframe where the DRX Cycle starts;

drx-InactivityTimer: the duration after the PDCCH occasion in which a PDCCH indicates a new UL or DL transmission for the MAC entity;

drx-RetransmissionTimerDL (per DL HARQ process): the maximum duration until a DL retransmission is received;

drx-RetransmissionTimerUL (per UL HARQ process): the maximum duration until a grant for UL retransmission is received;

drx-LongCycle: the Long DRX cycle;

drx-ShortCycle (optional): the Short DRX cycle;

drx-ShortCycleTimer (optional): the duration the UE shall follow the Short DRX cycle;

drx-HARQ-RTT-TimerDL (per DL HARQ process): the minimum duration before a DL assignment for HARQ retransmission is expected by the MAC entity;

drx-HARQ-RTT-TimerUL (per UL HARQ process): the minimum duration before a UL HARQ retransmission grant is expected by the MAC entity.

When a DRX cycle is configured, the Active Time includes the time while:

drx-onDurationTimer or drx-InactivityTimer or drx-RetransmissionTimerDL or drx-RetransmissionTimerUL or ra-ContentionResolutionTimer (as described in subclause 5.1.5) is running; or a Scheduling Request is sent on PUCCH and is pending (as described in subclause 5.4.4); or a PDCCH indicating a new transmission addressed to the C-RNTI of the MAC entity has not been received after successful reception of a Random Access Response for the Random Access Preamble not selected by the MAC entity among the contention-based Random Access Preamble (as described in subclause 5.1.4 of TS 38.321).

It should be noted that the term PDCCH may for instance refer to the PDCCH with common search space, or the PDCCH with the UE-specific search space, or even the GC-PDCCH (Group Common PDCCH) in the 5G NR.

As apparent therefrom, the DRX for 5G NR is also based on the Long DRX cycle and Short DRX cycle and the transition between them based on a Short DRX Cycle timer, defines an On-Duration at the beginning of the DRX cycle; a DRX Inactivity timer determines the duration of continued reception after receiving a PDCCH after which the UE goes to sleep. Therefore, conceptually the 5G-NR DRX mechanism works as illustrated in FIG. 3.

To summarize the above within the context of the improved concepts and aspects for the PDCCH monitoring as will be explained later, the UE monitors the PDCCH using timers to respectively control the On-Duration time as well as the DRX-inactivity time. While the corresponding timers are running, the UE is required to continue monitoring the PDCCH for the DRX operation.

Random Access Channel Procedure

An exemplary implementation of the random access function in 5G NR that involves PDCCH monitoring, according to the currently standardized version, will be explained in a simplified and abbreviated form in the following.

Once a UE has found a cell it may access the cell. This can be done using the random access procedure. The LTE RACH procedure will be described in the following in more detail, with reference to FIGS. 4 and 5. A mobile terminal in LTE can only be scheduled for uplink transmission, if its uplink transmission is time synchronized. Therefore, the Random Access Channel (RACH) procedure plays an important role as an interface between non-synchronized mobile terminals (UEs) and the orthogonal transmission of the uplink radio access. For instance, the Random Access in LTE is used to achieve uplink time synchronization for a user equipment which either has not yet acquired, or has lost, its uplink synchronization. Once a user equipment has achieved uplink synchronization, the eNodeB can schedule uplink transmission resources for it. One scenario relevant for random access is where a user equipment in RRC_CONNECTED state, handing over from its current serving cell to a new target cell, performs the Random Access Procedure in order to achieve uplink time-synchronization in the target cell.

LTE offers two types of random access procedures allowing access to be either contention based, e.g., implying an inherent risk of collision, or contention free (non-contention based) (see 3GPP TS 36.321, section 5.1, v15.5.0).

In the following the LTE contention-based random access procedure is being described in more detail with respect to FIG. 4. This procedure consists of four "steps." First, the user equipment transmits a random access preamble on the Physical Random Access Channel (PRACH) to the eNodeB (e.g., message 1 of the RACH procedure). After the eNodeB has detected a RACH preamble, it sends a Random Access Response (RAR) message (message 2 of the RACH procedure) on the PDSCH (Physical Downlink Shared Channel) addressed on the PDCCH with the (Random Access) RA-RNTI identifying the time-frequency slot in which the preamble was detected. If multiple user equipment transmitted the same RACH preamble in the same PRACH resource, which is also referred to as collision, they would receive the same random access response message. The RAR message may convey the detected RACH preamble, a timing alignment command (TA command) for synchronization of subsequent uplink transmissions, an initial uplink resource assignment (grant) for the transmission of the first scheduled transmission and an assignment of a Temporary Cell Radio Network Temporary Identifier (T-CRNTI). This T-CRNTI is used by eNodeB to address the mobile(s) whose RACH preamble was detected until the RACH procedure is finished, since the "real" identity of the mobile at this point is not yet known by the eNodeB.

The user equipment monitors the PDCCH for reception of the random access response message within a given time window (e.g., termed RAR time window), which is configured by the eNodeB. In response to the RAR message received from the eNodeB, the user equipment transmits the first scheduled uplink transmission on the radio resources assigned by the grant within the random access response. This scheduled uplink transmission conveys the actual random access procedure message like for example an RRC Connection Request, RRC Resume Request or a buffer status report.

FIG. 5 is illustrating the contention-free random access procedure of 3GPP LTE, which is simplified in comparison to the contention-based random access procedure. The eNodeB provides in a first step the user equipment with the preamble to use for random access so that there is no risk of collisions, e.g., multiple user equipment transmitting the same preamble. Accordingly, the user equipment is subsequently sending the preamble which was signaled by eNodeB in the uplink on a PRACH resource. Since the case that multiple UEs are sending the same preamble is avoided for a contention-free random access, essentially, a contention-free random access procedure is finished after having successfully received the random access response by the UE.

A similar or same RACH procedure as just explained in connection with FIGS. 4 and 5 is implemented for the new radio technology of 5G (see 38.321 v15.5.0 section 5.1).

Furthermore, 3GPP is also studying a two-step RACH procedure for 5G NR, where a message 1, that corresponds to messages 1 and 3 in the four-step RACH procedure, is transmitted at first. Then, the gNB will respond with a message 2, corresponding to messages 2 and 4 of the LTE RACH procedure. Due to the reduced message exchange, the latency of the two-step RACH procedure may be reduced compared to the four-step RACH procedure. The radio resources for the messages are optionally configured by the network.

To summarize the above within the context of the improved concepts and aspects for the PDCCH monitoring as will be explained later, the UE monitors the PDCCH using a timer to control the random access response time window, after having transmitted the RACH preamble as the first step of the RACH procedure. When the timer expires and no RAR was received, the UE does not need to continue with the PDCCH monitoring, but may, e.g., retransmit the RACH preamble. When the RAR is received within the RAR time window, the UE proceeds to the next step of the RACH procedure, e.g., transmitting a scheduled user data transmission.

PDCP Reordering

An exemplary implementation of the PDCP reordering function in 5G NR that involves PDCCH monitoring, according to the currently standardized version, will be explained in a simplified and abbreviated form in the following (see 3GPP TS 38.323 v15.5.0, e.g., sections 5.1.2, 5.2.1, 5.2.2).

The Packet Data Convergence Protocol (PDCP) performs IP header compression, ciphering, and integrity protection. It also handles retransmissions, in-sequence delivery and duplicate removal in case of handover. In particular, the PDCP can be responsible to perform reordering to ensure in-sequence delivery of SDUs (Service Data Units) (can be also be termed packets) to the higher-layer protocols. Reordering basically buffers a received SDU and does not forward it to higher layers until all lower-numbered SDUs have been delivered. A counter value is used to identify lost SDUs and request retransmission, as well as to reorder the received SDUs before delivery to upper layers.

To control the reordering function of the PDCP layer, a timer (e.g., called t-reordering) can be used. This timer is started when out-of-sequence delivery from the base station is detected and controls the amount of time that the UE may wait for the in-sequence delivery of a data packet (SDU) before proceeding further. While the t-reordering timer is running, the UE may monitor the PDCCH for the in-sequence delivery of a data packet (e.g., PDCP PDU). When such a data packet is received, the UE may proceed with the PDCP operation, e.g., deliver the in-sequence SDUs to the higher layer, and stops the t-reordering timer until next time the out-of-sequence delivery is detected.

Licensed-Assisted Access (LAA) and Enhanced LAA (eLAA)

The reason for extending LTE to unlicensed bands is the ever-growing demand for wireless broadband data in conjunction with the limited amount of licensed bands. The unlicensed spectrum therefore is more and more considered by cellular operators as a complementary tool to augment their service offering. The advantage of LTE in unlicensed bands compared to relying on other radio access technologies (RAT) such as Wi-Fi is that complementing the LTE platform with unlicensed spectrum access enables operators and vendors to leverage the existing or planned investments in LTE/EPC hardware in the radio and core network.

However, it has to be taken into account that unlicensed spectrum access can never match the qualities of licensed spectrum access due to the inevitable coexistence with other radio access technologies (RATs) in the unlicensed spectrum such as Wi-Fi. LTE operation on unlicensed bands was therefore at least in the beginning considered a complement to LTE on licensed spectrum rather than as stand-alone operation on unlicensed spectrum. Based on this assumption, 3GPP established the term Licensed Assisted Access (LAA) for the LTE operation on unlicensed bands in conjunction with at least one licensed band. Future stand-alone operation of LTE on unlicensed spectrum, e.g., without being assisted by licensed cells, however shall not be excluded, and such a stand-alone unlicensed operation is now foreseen for 5G NR.

The currently-intended general LAA approach at 3GPP is to make use of the already specified Rel-12 carrier aggregation (CA) framework as much as possible, where the CA framework configuration as explained before comprises a so-called primary cell (PCell) carrier and one or more secondary cell (SCell) carriers. CA supports in general both self-scheduling of cells (scheduling information and user data are transmitted on the same component carrier) and cross-carrier scheduling between cells (scheduling information in terms of PDCCH/EPDCCH and user data in terms of PDSCH/PUSCH are transmitted on different component carriers).

Usage of the unlicensed bands has also become a focus for the new 5G-NR development. The NR licensed design can be used as the baseline, and deployment scenarios such as the following can be considered:

Carrier aggregation between the NR licensed cell (e.g., PCell) and NR unlicensed cell (e.g., SCell) similar to LTE LAA Dual Connectivity (with LTE and with NR); ENU-DC in which the master eNB operates in licensed spectrum and secondary gNB operates in unlicensed spectrum; NNU-DC in which the master NB operates in licensed spectrum and the secondary gNB operates in unlicensed spectrum Stand-Alone (SA): NR-U SA, in which a standalone NR PCell operates in the unlicensed spectrum An NR radio cell with Downlink in unlicensed band and UL in licensed band In NR, Listen-Before-Talk, is to be performed on unlicensed carriers. In particular, transmitting entities perform LBT, and channel occupation is only allowed after a successful LBT Clear Channel Assessment (CCA).

Figure 6:
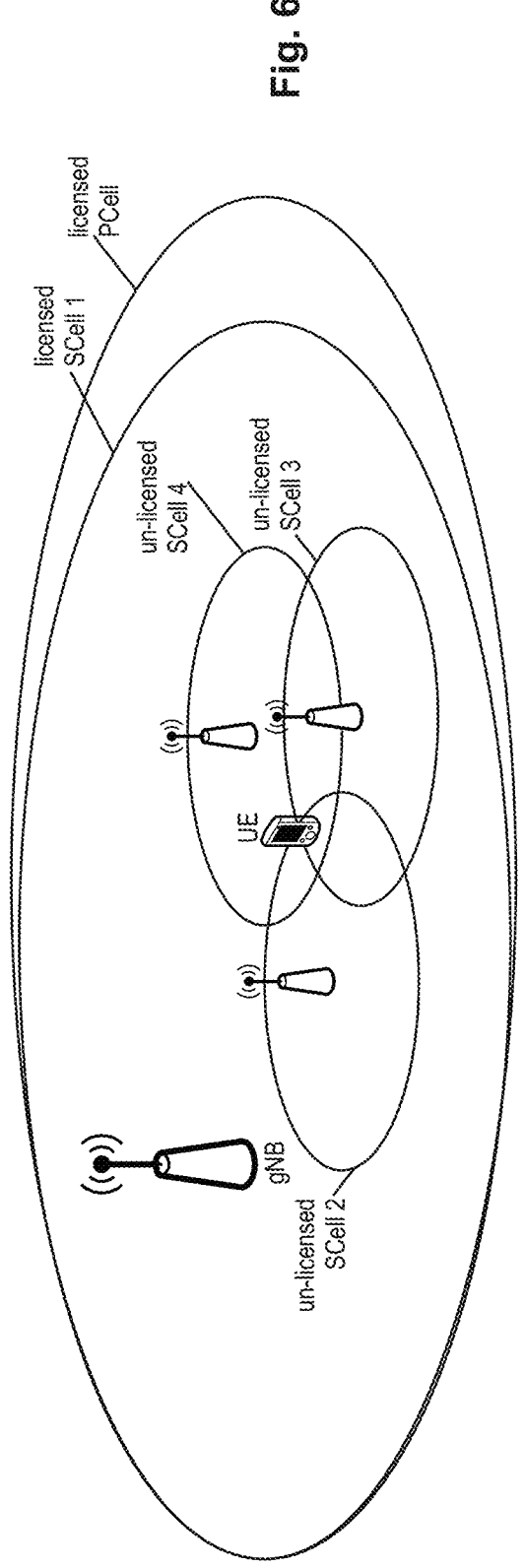
FIG. 6 illustrates an exemplary LAA scenario with several licensed und unlicensed cells.

A very simple scenario is illustrated in FIG. 6, with a licensed PCell, licensed SCell 1, and various unlicensed SCells 2, 3, and 4 (exemplarily depicted as small cells). The transmission/reception network nodes of unlicensed SCells 2, 3, and 4 could be remote radio heads managed by the eNB or could be nodes that are attached to the network but not managed by the eNB. For simplicity, the connection of these nodes to the eNB or to the network is not explicitly shown in the figure. Furthermore, unlicensed radio cell 5 illustrates a stand-alone scenario of an NR PCell that operates in the unlicensed spectrum.

One of the most critical issues is the coexistence with other systems, such as Wi-Fi (IEEE 802.11) systems operating at these unlicensed bands. In order to support fair coexistence between LTE, 5G NR and other technologies such as Wi-Fi, as well as to guarantee fairness between different operators in the same unlicensed band, the channel access for unlicensed bands has to abide by certain sets of regulatory rules which partly may depend on the geographical region and particular frequency band (see, e.g., 3GPP Technical Report TR 36.889, version 13.0.0). Depending on region and band, regulatory requirements that have to be taken into account when designing LAA and 5G NR procedures comprise Dynamic Frequency Selection (DFS), Transmit Power Control (TPC), Listen Before Talk (LBT) and discontinuous transmission with limited maximum transmission duration (may also be termed channel occupancy time, or channel acquisition time or similar expressions). A single global framework can be targeted which basically means that all requirements for different regions and bands at 5 GHz can be taken into account for the system design.

The listen-before-talk (LBT) procedure is defined as a mechanism by which a device applies a clear channel assessment (CCA) check before using the channel. According to one exemplary implementation, the CCA utilizes at least energy detection to determine the presence or absence of other signals on an unlicensed channel in order to determine if a channel is occupied or clear, respectively. European and Japanese regulations for instance mandate the usage of LBT in the unlicensed bands. Apart from regulatory requirements, this carrier sensing via LBT is one way for fair sharing of the unlicensed spectrum and is thus considered to be a vital feature for fair and friendly operation in the unlicensed spectrum in a single global solution framework.

In the unlicensed spectrum, the channel availability cannot always be guaranteed. In addition, certain regions such as Europe and Japan prohibit continuous transmissions and impose limits on the maximum duration of a transmission burst in the unlicensed spectrum (maximum channel occupancy). Hence, discontinuous transmission with limited maximum transmission duration is a functionality for LAA and 5G NR.

Following this European regulation regarding LBT, devices have to perform a clear channel Assessment (CCA) before occupying the unlicensed radio channel with a data transmission. In such restricted exemplary scenarios, it is only allowed to initiate a transmission on the unlicensed channel after detecting the channel as free based, e.g., on energy detection. In particular, the equipment has to observe the channel for a certain minimum time (e.g., for Europe 20 µs, see ETSI 301 893, clause 4.8.3) during the CCA. The channel is considered occupied if the detected energy level exceeds a configured CCA threshold (e.g., for Europe, −73 dBm/MHz, see ETSI 301 893, clause 4.8.3), and conversely is considered to be free if the detected power level is below the configured CCA threshold. If the channel is determined as being occupied, it shall not transmit on that channel during the next Fixed Frame Period. If the channel is classified as free, the equipment is allowed to transmit immediately. The maximum transmit duration is restricted in order to facilitate fair resource sharing with other devices operating on the same band.

The CCA can be performed repeatedly, optionally with a backoff time in between.

Furthermore, the total time during which an equipment has transmissions on a given carrier without re-evaluating the availability of that carrier (e.g., LBT/CCA) is defined as the channel occupancy time (see, e.g., ETSI 301 893, clause 4.8.3.1). The channel occupancy time shall be in the range of 1 ms to 10 ms, where the maximum channel occupancy time could be, e.g., 4 ms as currently defined for Europe. Furthermore, there is a minimum Idle time the UE is not allowed to transmit after a transmission on the unlicensed cell, the minimum Idle time being at least 5% of the channel occupancy time. Towards the end of the Idle Period, the UE can perform a new CCA, and so on.

Moreover, the CCA may not be required within a specific time period after receiving a signal by another entity, e.g., within 16 microseconds, as part of a shared COT. For instance, switching between DL and UL, and between UL and DL, within a shared gNB COT, does not require LBT.

Figure 7:
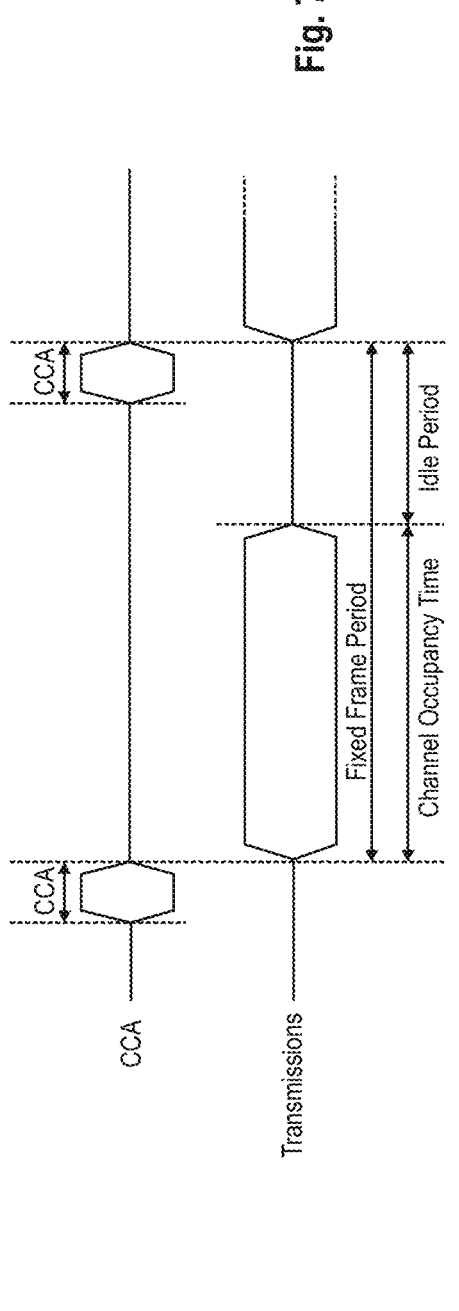
FIG. 7 illustrates the transmission behavior for an LAA transmission.

This transmission behavior is schematically illustrated in FIG. 7 (see, e.g., ETSI EN 301 893).

Consequently, the operation on unlicensed radio cells requires any transmitter to perform Listen-Before-Talk as described above. This is also applies to the transmission of the PDCCH by the base station, and as a result can have also an impact on the PDCCH monitoring by the UE.

Many different functions operated by the UE (see above examples) involve monitoring the PDCCH and can thus be impacted by LBT failures of the gNB acquiring the unlicensed cell (can also be expressed: obtaining the unlicensed spectrum of the unlicensed radio cell).

One possible solution to compensate for these LBT failures by the gNB side for scenarios in which the radio cell is operated in an unlicensed spectrum, is to extend the respective time that the PDCCH is monitored, e.g., compared to the licensed radio cell operation. Thereby, the possibility that the gNB successfully acquires the unlicensed spectrum and thus reaches the UE for, e.g., transmitting the PDCCH and/or possibly the PDSCH is increased.

For example, to add more opportunities for the gNB to transmit the system information, it may be possible to configure a longer SI window for NR-Unlicensed operation. Further, a longer DRX-On-Duration can be configured to accommodate possible LBT failures. The reduced transmission opportunities for paging caused by LBT failures can be compensated by increasing the paging occasion length or increasing the number of paging occasions. As a further example, the RAR window size can be extended, e.g., to 20 ms. Configuring a longer PDCCH monitoring time window to compensate for the LBT failures at the gNB side may be a simple solution, using the existing functions as much as possible, having thus almost no impact on any of the 3GPP specifications.

However, simply configuring a longer PDCCH monitoring duration (e.g., statically/semi-statically) may also result in a higher UE power consumption, because the UE is required to monitor the PDCCH for a longer duration of time. This power drawback may occur especially when the channel is not busy. In particular, assuming that the unlicensed spectrum is not blocked by another entity, the gNB would have soon the opportunity to send the PDCCH (and possibly PDSCH), but if the gNB still does not address the UE, the UE monitors the PDCCH for a longer time without any benefit.

Consequently, the inventors have identified the possibility to improve the monitoring of the PDCCH for one or more of the above-cited functions (e.g., DRX, Paging, System Information, Random Access, PDCP Reordering) when operating in the unlicensed frequency spectrum. The invention can also be applied to other functions that involve the monitoring of the PDCCH, not explicitly mentioned above.

In the following, UEs, base stations, and procedures to meet these needs will be described mainly for the new radio access technology envisioned for the 5G mobile communication systems, but which may also be used in LTE mobile communication systems. Different implementations and variants will be explained as well. The following disclosure was facilitated by the discussions and findings as described above and may for example be based at least on part thereof and may be implemented within such systems.

In general, it should be noted that many assumptions are made herein so as to be able to explain the principles underlying the present disclosure in a clear and understandable manner. These assumptions are however to be understood as merely examples made herein for illustration purposes that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers, etc., used in the following are closely related to LTE/LTE-A systems or to terminology used in the current 3GPP 5G standardization, even though specific terminology to be used in the context of the new radio access technology for the next 3GPP 5G communication systems is not fully decided yet or might finally change. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

FIG. 8 illustrates a general, simplified and exemplary block diagram of a user equipment (also termed communication device) and a scheduling device (here exemplarily assumed to be located in the base station, e.g., the eLTE eNB (alternatively termed ng-eNB) or the gNB in 5G NR). The UE and eNB/gNB are communicating with each other over a (wireless) physical channel respectively using the transceiver.

The communication device may comprise a transceiver and processing circuitry. The transceiver in turn may comprise and/or function as a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, e.g., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data, which is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto, such as monitoring a channel.

An improved monitoring of the downlink control channel (e.g., the PDCCH) will be described in the following.

The solutions offered in the following will be described mainly in connection with the 5G NR Unlicensed scenarios, but may also be applicable to unlicensed operation in LTE(A). As explained above with reference to FIG. 6, the UE can be located in an unlicensed radio cell operated by a gNB (e.g., one of the unlicensed SCells in FIG. 6, or a standalone unlicensed radio cell). The UE is configured to perform many functions, also comprising functions that involve monitoring of the downlink control channel transmitted by the gNB in the unlicensed radio cell (using the unlicensed frequency spectrum). In brief, the downlink control channel can be used by the gNB to transmit downlink control information (e.g., scheduling downlink or uplink transmissions on the corresponding downlink/uplink shared channel) and user data.

FIG. 9 illustrates a simplified and exemplary UE structure according to an exemplary solution of an improved monitoring of the downlink control channel and can be implemented based on the general UE structure explained in connection with FIG. 8 above. The various structural elements of the UE illustrated in said figure can be interconnected between one another, e.g., with corresponding input/output nodes (not shown), e.g., in order to exchange control and user data and other signals. Although not shown for illustration purposes, the UE may include further structural elements. As apparent therefrom, the UE may include function operation circuitry, downlink control channel monitoring circuitry, circuitry for the parallel operation of a first and second timer, and channel occupation status determination circuitry.

In the present case as will become apparent from the below disclosure, the processing circuitry can thus be exemplarily configured to at least partly perform one or more of operating one or more functions, of monitoring the downlink control channel, as well as operating the first and second timers. The receiver can thus be exemplarily configured to at least partly perform one or more of monitoring the downlink control channel and of receiving the information intended for the UE via the downlink control channel.

FIG. 10 is a schematic illustration of the different functions that can be operated by the UE. As apparent, the UE can operate several different functions #1 to #N, such as the functions mentioned above. For instance, the functions #1 to #N can be the paging message monitoring function,
the system information acquisition function,
the signaling monitoring operation for a DRX function,
the inactivity monitoring operation for a DRX function,
a random access response reception for a random access function, and
a reordering function of a PDCP layer.

Each of the operated functions involves the parallel operation of a first and second timer, as well as the monitoring of the downlink control channel. The respective first and second timer are typically different between the different functions, e.g., having different timer values as well as different purposes, as will become apparent further below.

The concepts and aspects for the improved downlink control channel monitoring procedure will be first explained independently from the different function, focusing on the common aspects that facilitate overcoming problems of the prior art.

Figure 11:
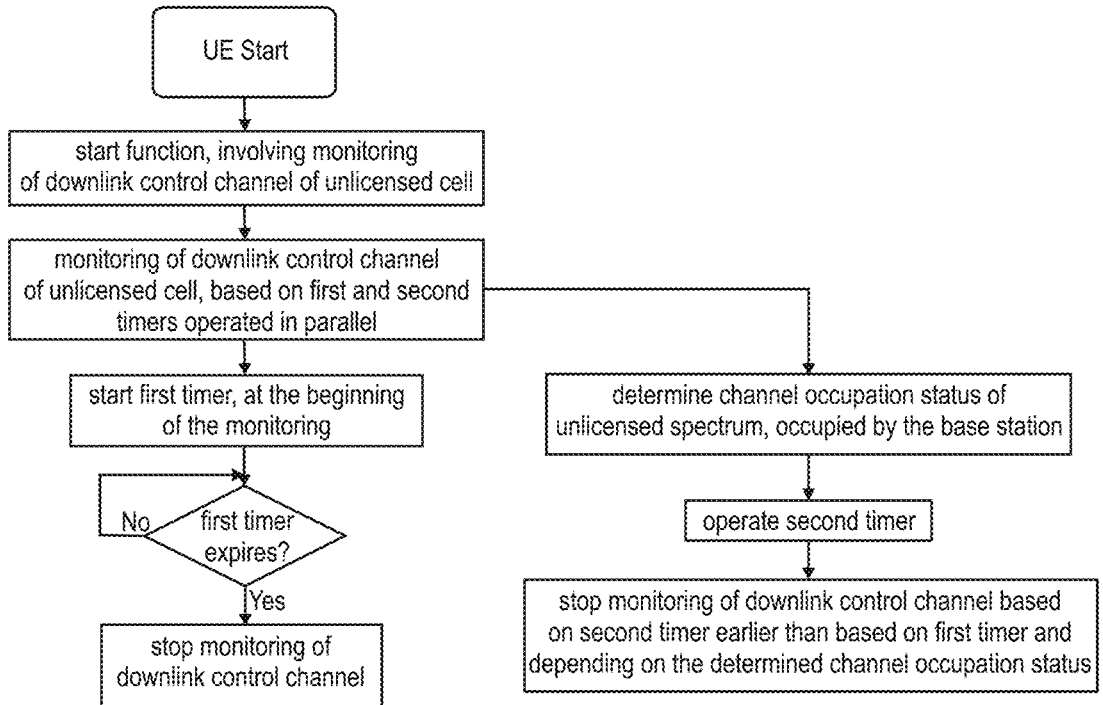
FIG. 11 is a flow diagram for the behavior of a UE, according to an exemplary implementation for an improved downlink control channel monitoring procedure.

FIG. 11 is a sequence diagram for an exemplary UE behavior according to this improved downlink control channel monitoring procedure. As apparent therefrom, it is assumed that the UE performs a function that involves the monitoring of the downlink control channel of an unlicensed radio cell. The monitoring of the downlink control channel is performed based on a first timer and a second timer that are operated in parallel, e.g., when the monitoring of the downlink control channel is stopped can be controlled by the use of the two timers.

Correspondingly, the first timer is used to limit the maximum time the downlink control channel is to be monitored by the UE. To said end, the first timer is started when the UE begins the monitoring of the downlink control channel according to the operated function, and the monitoring is then stopped at the latest upon expiry of the first timer. This first timer is configured and operated independently from the channel occupation status of the unlicensed spectrum. In one optional implementation, the first timer can be a timer as used in the prior art for controlling the monitoring of the downlink control channel for an operated function (e.g., the paging occasion timer for the paging function, or the on duration timer for the DRX function, or the timer for the system information acquisition window, or the inactivity timer for the DRX function, or the timer for the RAR window, or the PDCP reordering timer). The timer value for the first timer can be, e.g., extended for the unlicensed scenario, compared to the licensed scenario (see above discussion of a simple solution and the resulting drawback).

On the other hand, the second timer is to be used to be able to stop the monitoring of the downlink control channel earlier than the first timer, depending on the channel occupation status of the unlicensed spectrum of the radio cell. Put differently, the purpose of the second timer is to shorten the time the UE monitors the downlink control channel where possible or appropriate, based on the channel occupation status of the unlicensed spectrum by the gNB. For instance, the channel occupation status of the channel is taken into account for how the second timer is used to stop the monitoring, e.g., such that where the gNB is able to occupy the channel, but is nonetheless not sending information (e.g., control information or data) to the UE, the monitoring can be stopped earlier. This follows from the consideration that the gNB is not inhibited from reaching the UE due to any LBT failure, but rather the gNB does not need or cannot reach the UE for another reason (that is possibly unrelated to the LBT). Therefore, the second timer is to compensate for LBT failures but not for other reasons that the gNB does not reach the UE, by enabling the UE to stop the channel monitoring earlier than the first timer, depending on the channel occupation status.

This second timer is operated in parallel by the UE, e.g., not one timer subsequent to the other timer. The function-specific monitoring of the downlink control channel can be stopped based on either the first and second timer. Thus, the parallel operation of the two timers for controlling when to stop the monitoring allows the benefit of stopping the monitoring earlier when possible based on the second timer and the channel occupation status, while ensuring a maximum monitoring time of the downlink control channel through the use of the first timer. Thus, the power used for monitoring the downlink control channel can be reduced at some instances.

Correspondingly, while the monitoring of the downlink control channel for a particular function is based on the first timer when operating in a licensed radio cell, the monitoring of the downlink control channel for that particular function is based on the first and the second timer when operating in an unlicensed radio cell.

One possible exemplary implementation to facilitate that the second timer expires earlier than the first timer is to configure a smaller timer value for the second timer than for the first timer. The smaller the second timer is compared to the first timer, the more power saving gains the UE can achieve. However, the gNB will have less time to reach the UE according to the function (e.g., paging the UE in time, etc.)

Turning back to the flow diagram of FIG. 11, the UE operates the first timer and the second timer in parallel for the purpose of controlling when to stop the monitoring of the downlink control channel. As illustrated in FIG. 11, the improved monitoring procedure involves the determination of the channel occupation status of the unlicensed spectrum for using the second timer to stop the monitoring, while the first timer is operated independently from the channel occupation status of the unlicensed spectrum. The second timer is then used to control whether it is appropriate to stop the monitoring of the downlink control channel earlier than with the first timer. Whether or not the monitoring is stopped earlier depends on the channel occupation status of the unlicensed spectrum during the monitoring of the downlink control channel.

As mentioned before, the monitoring of the downlink control channel is performed as part of an operated function and is thus very specific to the operated function. The function itself may already define some function-specific conditions when to begin and when to stop the monitoring of the downlink control channel. For instance, the monitoring can also be terminated when receiving information intended for the UE in line with the purpose of the operated function.

For instance, the paging-function-specific monitoring of the downlink control channel is also stopped when receiving a paging message. In other words, the paging function requires the UE to monitor the downlink control channel during a paging occasion in order to be able to receive a paging message. In this particular function, the downlink control channel monitoring is stopped not only based on the first and second timer operations, but also when a paging message is received. According to a different function, the downlink control channel is monitored for an inactivity of the DRX function, where the monitoring of the downlink control channel is stopped based on the first and second timer operations, however the monitoring is continued (not stopped) in case information intended for the UE is indeed received.

Overall, the improved downlink control channel monitoring as explained above and below provides an additional termination of the PDCCH monitoring that is based on the use of a second timer and based on the channel occupation status of the corresponding unlicensed spectrum of the unlicensed radio cell. The benefit to be obtained is to reduce the time the UE is required to perform the monitoring of the downlink control channel and thus allows the UE opportunities to skip the monitoring and thus save power.

On the other hand, by terminating earlier the function-specific monitoring of the downlink control channel, the UE may be able to move earlier to the next step of the function and therefore shorten the latency for certain procedures. For instance, when assuming the random access function, early termination of the random access response monitoring can trigger an earlier retransmission of the RACH preamble. Another example is the PDCP reordering function, which may also benefit from an early termination of the monitoring, because a PDU status report can be sent earlier to the transmitting side to request retransmission of the missing out-of-sequence PDUs.

The above-explained improved monitoring of the downlink control channel involves the determination of the channel occupation status of the unlicensed spectrum of the unlicensed radio cell. The UE can determine this channel occupation status in a variety of ways. According to one exemplary implementation, the base station periodically transmits a channel occupation signal when it has acquired/occupied the unlicensed spectrum, while not transmitting the channel occupation signal when the base station has not occupied the unlicensed spectrum. The UE can thus deduce the channel occupation status at all times from the reception or non-reception of the channel occupation signal. Optionally, the channel occupation signal may include information on the expected length of the channel occupation by the gNB. According to a different implementation, the channel occupation signal is not transmitted periodically but only at the beginning when acquiring the unlicensed spectrum, but the channel occupation signal further includes information about the length of the channel occupation, so as to allow the UE to derive how long the channel occupation will last. According to a still further alternative, to indicate the beginning of the channel occupation, the gNB broadcasts a channel occupation signal when beginning the channel occupation and broadcasts a further channel occupation signal when terminating the channel occupation so as to indicate the end of the channel occupation.

According to current 3GPP discussions, a channel occupation signal (also termed COT indication) can be transmitted periodically by the gNB. The content and how it is signaled is not yet agreed. However, the Layer 1 (L1) UE may indicate the second and third layers of the UE (L2 and L3) about the COT status, e.g., when the gNB occupies the unlicensed spectrum and optionally (see above alternatives) when the gNB stops occupying the unlicensed spectrum.

One further exemplary assumption is that the timer value for the first timer is longer when being operated for downlink control channel monitoring in an unlicensed radio cell scenario than when being operated in a licensed radio cell scenario. As explained before, one possible solution to compensate for LBT failures is to increase the length of the timers controlling the monitoring of the downlink control channel (e.g., PDCCH) when operating in an unlicensed radio cell. Correspondingly, the gNB configures the UEs with a longer timer value when communicating with the UE via an unlicensed radio cell. Then, to be able to reduce the extra power expense for the lengthened monitoring in unlicensed radio cells where possible, the second timer is implemented as explained before and below. There is no need for the second timer when operating in a licensed radio cell.

The first and second timers can be configured in different ways. For instance, the first and second timers can be configured individually, e.g., by the gNB. In said respect, the gNB transmits configuration information to the UE, including separate indications to configure the first and second timer (e.g., two different timer values, the timer value for the second timer being smaller than the timer value for the first timer). This configuration information can be provided separately for each of the operated functions, thereby individually configuring first and second timers for each function.

On the other hand, the first and second timer can be configured together, one timer being configured dependent on the other timer, wherein, e.g., the second timer is determined based on the first timer. For instance, configuration information can be transmitted by the gNB to configure the first timer (e.g., in a usual manner as already done in the prior art solutions, see 3GPP functions described above). Then, the second timer is determined by the UE to be a fraction of the first timer. For instance, the unlicensed-related first timer value is multiplied by a scaling factor (e.g., between 0 and 1) to determine the timer value of the second timer.

In turn, the scaling factor (or fraction) can be, e.g., configured by the gNB using a configuration message, e.g., together when configuring the unlicensed-related first timer. Alternatively, the scaling factor may be defined by a 3GPP specification and thus hard-coded into the UE or the SIM-Card of the UE.

According to further exemplary implementations, the same or different scaling factors may be used for determining the second timer based on the first timer for the different functions operated in the UE. The same scaling factor may be used for all or a subset of the operated functions.

According to further exemplary implementations, when gNB decides to amend the value of the scaling factor and sends a configuration message to UE to change the value of the scaling factor, UE may apply the change gradually over a period of time instead of changing the value of the scaling factor immediately upon receiving the configuration message.

According to a further exemplary implementation, the unlicensed-related second timer (used by the UE to monitor the downlink control channel for the function when in an unlicensed radio cell) can be configured to be the same or similar to the licensed-related first timer used by the UE (to monitor the downlink control channel for the function when in a licensed radio cell). Particularly, the timer value for the unlicensed-related second timer can be the same or similar to the timer value for the licensed-related first timer. Reuse of the configuration for the licensed-related first timer to configure the unlicensed-related second timer facilitates implementation and reduces the impact on the 3GPP specifications.

On the other hand, the first timer when being operated in an unlicensed radio cell (exemplarily termed unlicensed-related first timer) may in turn be configured dependent on the first timer when being operated in a licensed radio cell (exemplarily termed licensed-related first timer). For instance, the unlicensed-related first timer may be simply a multiple of the time of the licensed-related first timer. Alternatively, the unlicensed-related first timer can be given by a 3GPP specification, and thus, e.g., hard-coded into the UE or the SIM-Card of the UE.

In a 3GPP-specific exemplary implementation, configuration information can be transmitted by the gNB to the UE using messages of the RRC.

In the following, two different exemplary implementations of the above discussed improved monitoring of downlink control channel will be described. A first implementation will be described with reference to FIGS. 12 and 13. A second implementation will be described with reference to FIGS. 14, 15 and 16. The first and second implementation mainly differ in how the second timer is operated depending on the channel occupation status, and the resulting stopping of the monitoring procedure of the downlink control channel.

According to the first alternative implementation, the second timer is operated to accumulate the time the downlink control channel is monitored while the gNB has occupied the unlicensed spectrum. Put differently, while the first timer is running independently from the channel occupation to count the time the downlink control channel is monitored, the second timer runs if the gNB has occupied the unlicensed spectrum but does not run if the gNB has not occupied the unlicensed spectrum. The second timer thus only accumulates time where the gNB is actually able to reach the UE via the unlicensed radio cell (while ignoring other times whether the gNB is not able to reach the UE, e.g., because of LBT failures, where the unlicensed spectrum already busy and is occupied by other systems or other gNBs). Correspondingly, the second timer in said respect a similar to the first timer that is operated in a licensed radio cell.

Figure 12:
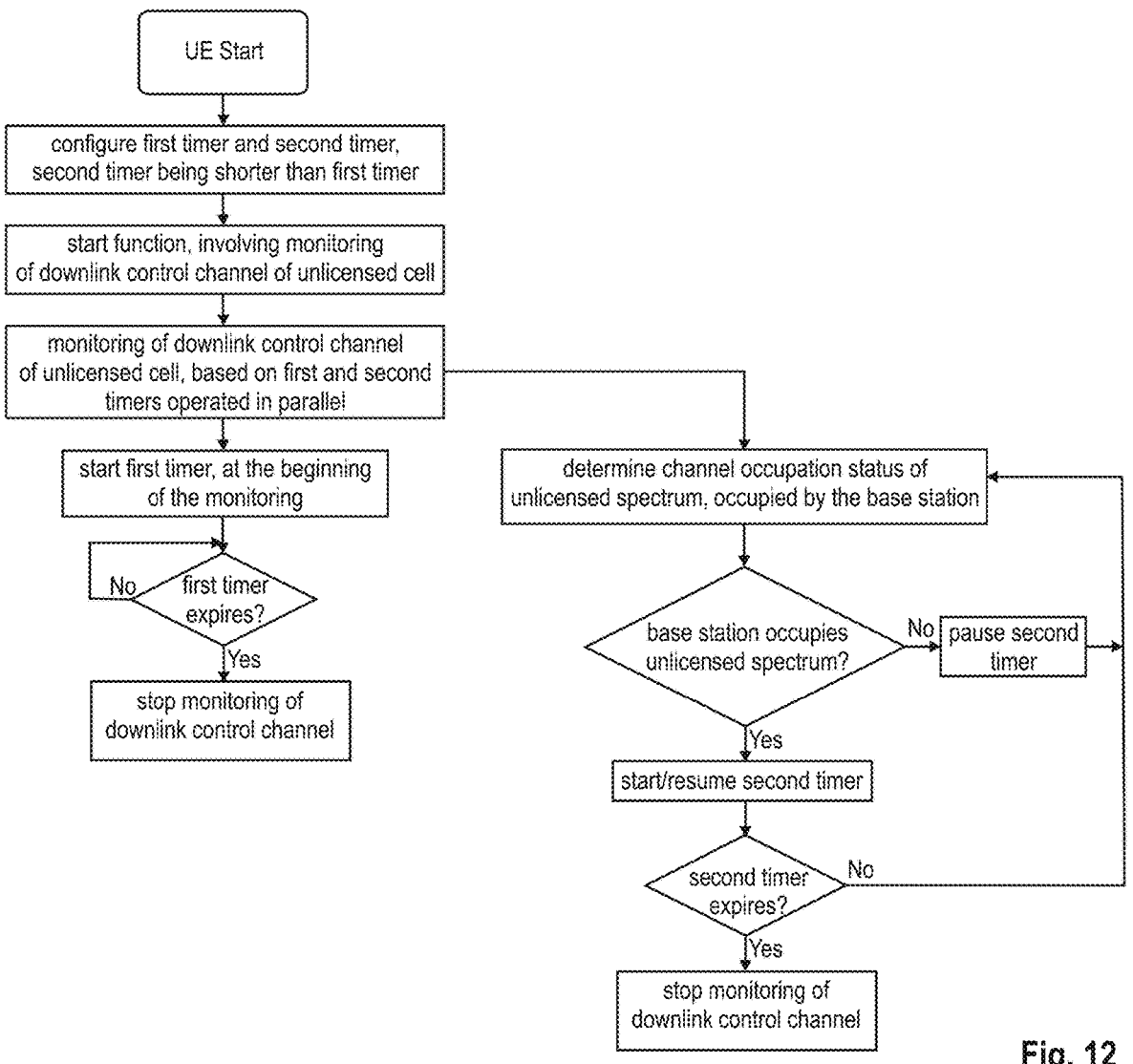
FIG. 12 is a flow diagram for the behavior of a UE, according to a first exemplary implementation of the improved downlink control channel monitoring procedure.

FIG. 12 illustrates that the monitoring of the downlink control channel is started as part of the function. Then, the beginning of the function-specific monitoring triggers the start of the first timer and as well as the operation of the second timer. However, whether the second timer is started (for the first time), resumed, or stopped depends on the channel occupation status. Thus, the UE is to determine the channel occupation status of the unlicensed spectrum. It is exemplarily assumed that the gNB eventually acquires the unlicensed spectrum (for the first time after the monitoring is started), in which case the second timer is started. The second timer is kept running during the channel occupation time and is then stopped when the unlicensed channel is no longer occupied by the gNB. The second timer can again be resumed when the gNB again occupies the unlicensed spectrum. The second timer is thus operated until it expires, in which case the downlink control channel monitoring is stopped. Optionally, the first timer can be stopped as well upon expiry of the second timer, because there is no need for the first timer to keep running considering that the monitoring of the downlink control channel was already stopped based on the second timer (not illustrated in FIG. 12).

Figure 13:
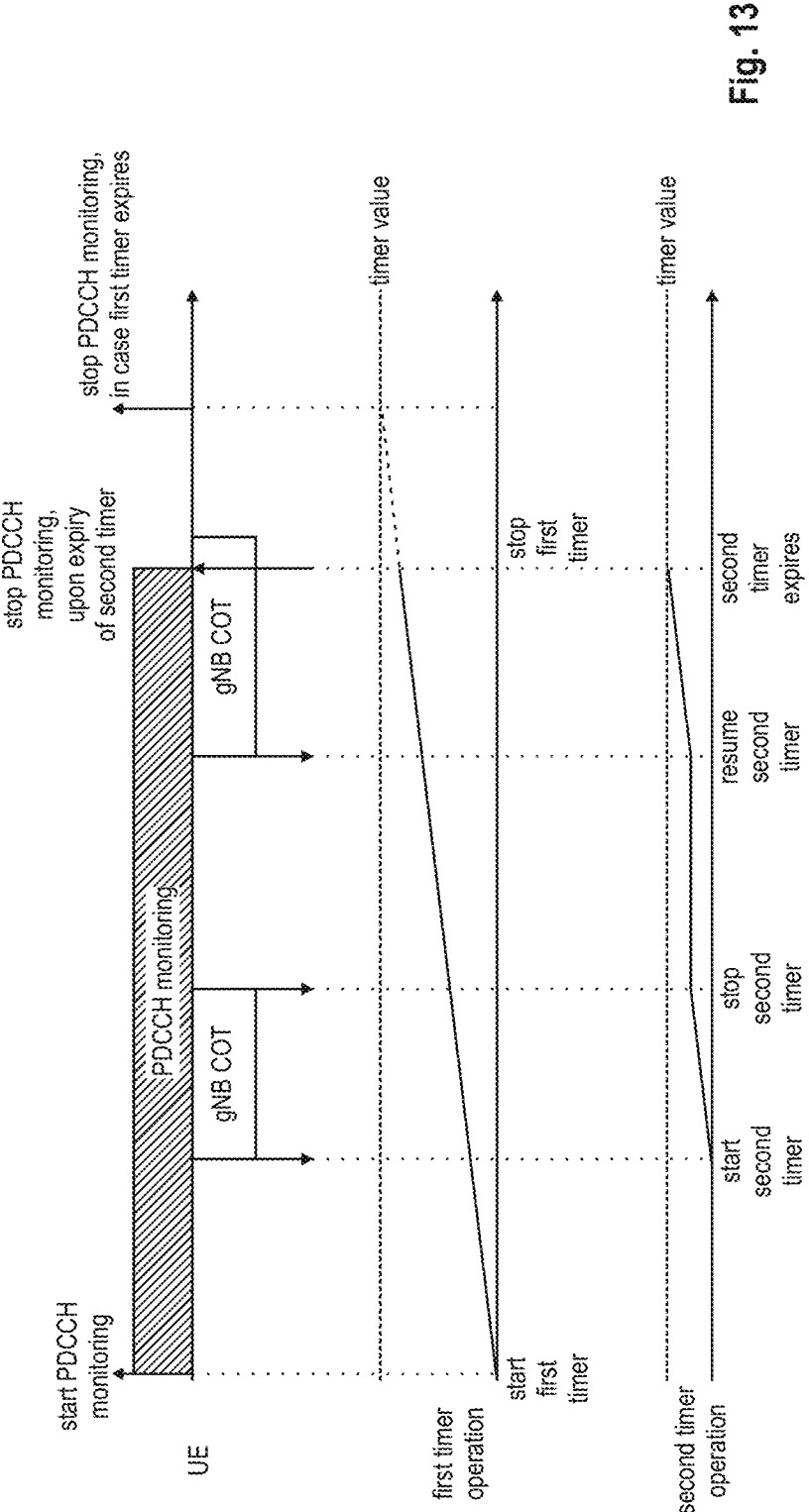
FIG. 13 illustrates the parallel operation of the first and second timers and the resulting PDCCH monitoring according to the first exemplary implementation of the improved downlink control channel monitoring procedure explained in FIG. 12.

FIG. 13 illustrates the improved downlink control channel monitoring procedure according to the alternative presented above with reference to FIG. 12 in an exemplary scenario. FIG. 13 illustrates at the top when the downlink control channel (here the PDCCH) is monitored as well as the channel occupation by the gNB (termed gNB COT). In the middle of FIG. 13 the operation of the first timer is illustrated, and at the bottom the operation of the second timer. Horizontal dashed lines indicate the timer value of the respective timers, where the timer value of the second timer is significantly lower than the timer value for the first timer. When a timer reaches the respective timer value (horizontal line), it expires.

As apparent, the first timer is started at the same time as the monitoring of the PDCCH and runs continuously independent from the gNB COT. On the other hand, the second timer does not start at the beginning of the PDCCH monitoring, but rather when the gNB acquires the unlicensed spectrum. The second timer runs until the end of the first gNB COT, then resumes again at the second gNB COT. In the exemplary scenario it is assumed that the second timer expires before the end of the second gNB COT, and the PDCCH monitoring is stopped (as illustrated at the top of FIG. 13).

FIG. 13 is only an example, hypothetically assuming particular timer values and gNB COT lengths. In other scenarios, the second timer might expire earlier than in FIG. 13 (e.g., during the first gNB COT), or even not at all in which case the first timer could expire first (see in FIG. 13 "stop PDCCH monitoring in case first timer expires" at the top right side).

Figure 14:
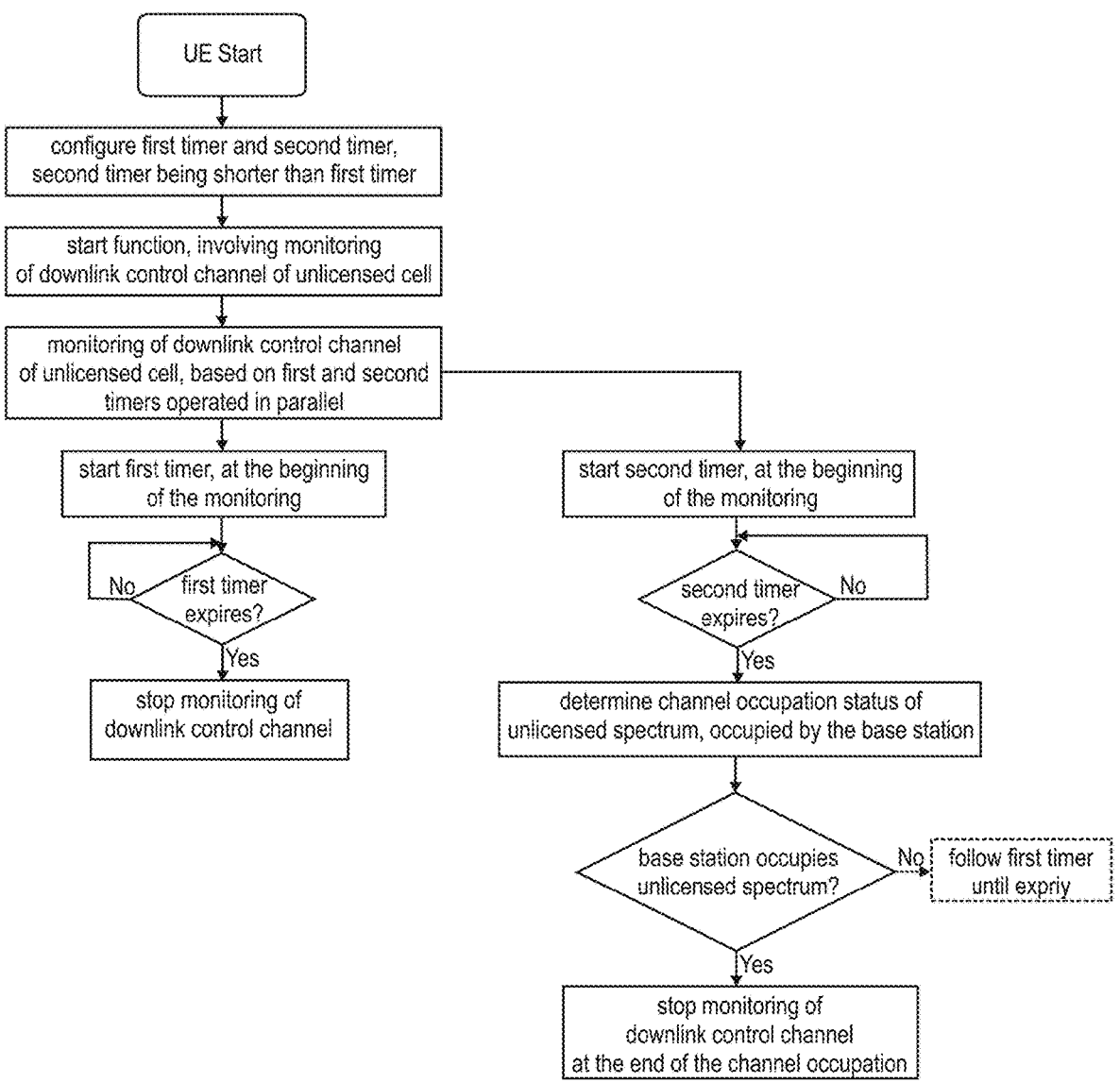
FIG. 14 is a flow diagram for the behavior of a UE, according to a second exemplary implementation of the improved downlink control channel monitoring procedure.

FIG. 14 illustrates a flow diagram for a second alternative implementation of the improved downlink control channel monitoring procedure. The second alternative implementation differs from the first one mainly in how the second timer is operated. In particular, the second timer is started basically at the same time as the first timer, e.g., when the PDCCH monitoring begins. Further, the second timer, same as the first timer, runs continuously independently from the gNB COT until it expires (or is stopped because the other timer expires first). Upon expiry of the second timer, the UE is to evaluate the channel occupation status of the unlicensed spectrum (e.g., by determining, in response to the expiry of the second timer, the channel occupation of the unlicensed spectrum by the gNB). If the base station occupies the unlicensed spectrum, the UE continues to monitor the PDCCH until the end of this current COT, as to whether the gNB (having acquired the unlicensed spectrum) transmits information to the UE. The monitoring is stopped at the end of the current gNB channel occupation time. On the other hand, if the UE determines that the base station has not occupied the unlicensed spectrum, no specific action by the UE is needed, but it follows the first timer operation, and the monitoring of the downlink control channel continues until the first timer expires (dashed box and arrow in FIG. 14).

Correspondingly, the second timer is used to incorporate a one-time check of the COT (upon expiry of the second timer), so as to stop the monitoring earlier when determining that the gNB is currently occupying the unlicensed channel. In other words, if the UE determines that the gNB has acquired the unlicensed spectrum but does not transmit any UE-directed information/data to the UE (second timer expires during a COT, but no data is received during the monitoring), the UE assumes that further monitoring the PDCCH is not beneficial; the monitoring is stopped when the gNB COT ends.

The second implementation according to FIG. 14 is simpler than the solution of FIG. 12, because the UE does not continuously determine the channel occupation status, and does not have to accumulate the COT lengths. Rather, the UE checks the COT status only once at the time when the second timer expires. Still, in those cases where the second timer expires during a gNB COT, the monitoring time is shortened, and thus power can be saved.

Figure 15:
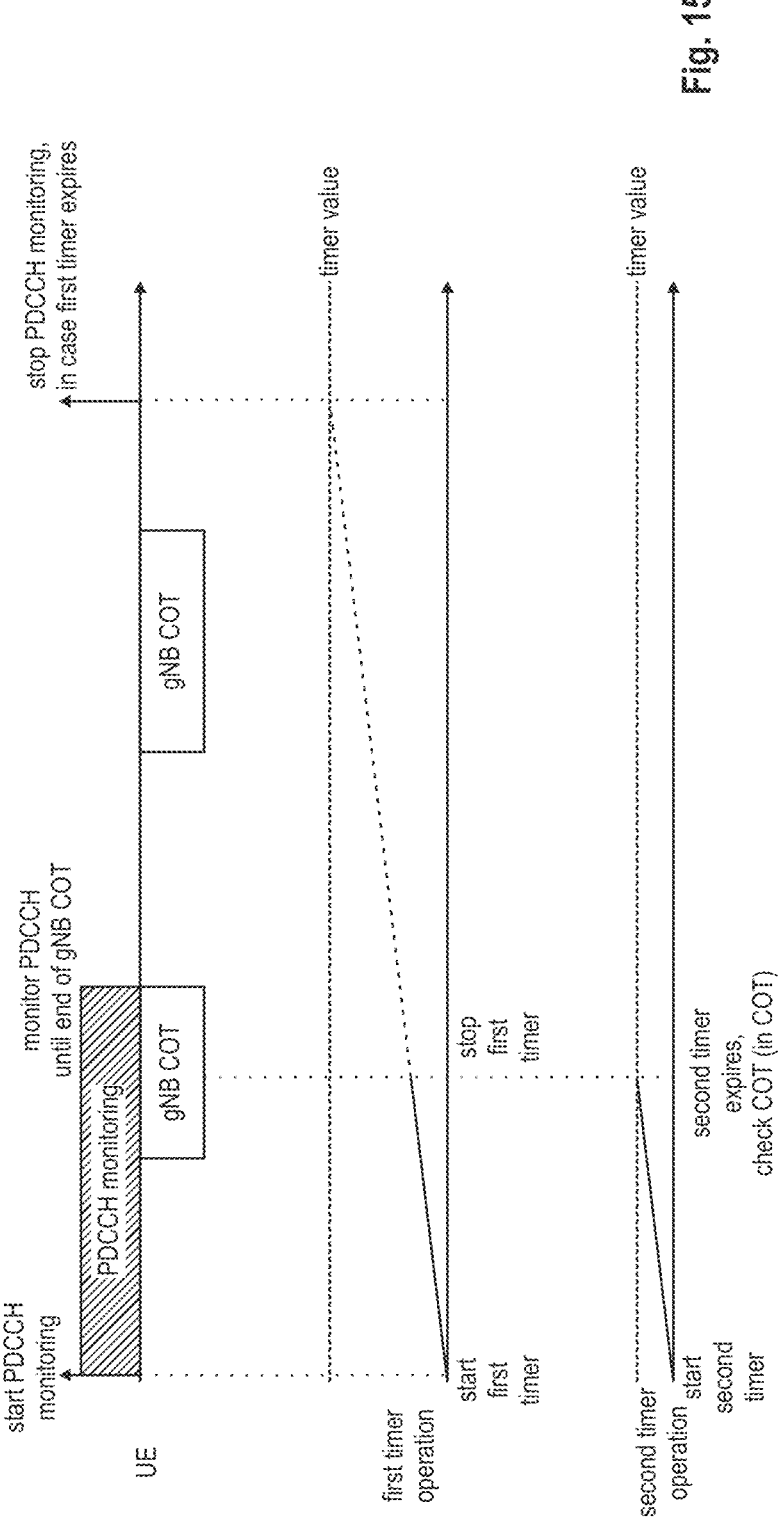
FIG. 15 illustrates the parallel operation of the first and second timers and the resulting PDCCH monitoring according to the second exemplary implementation of the improved downlink control channel monitoring procedure explained in FIG. 14.
Figure 16:
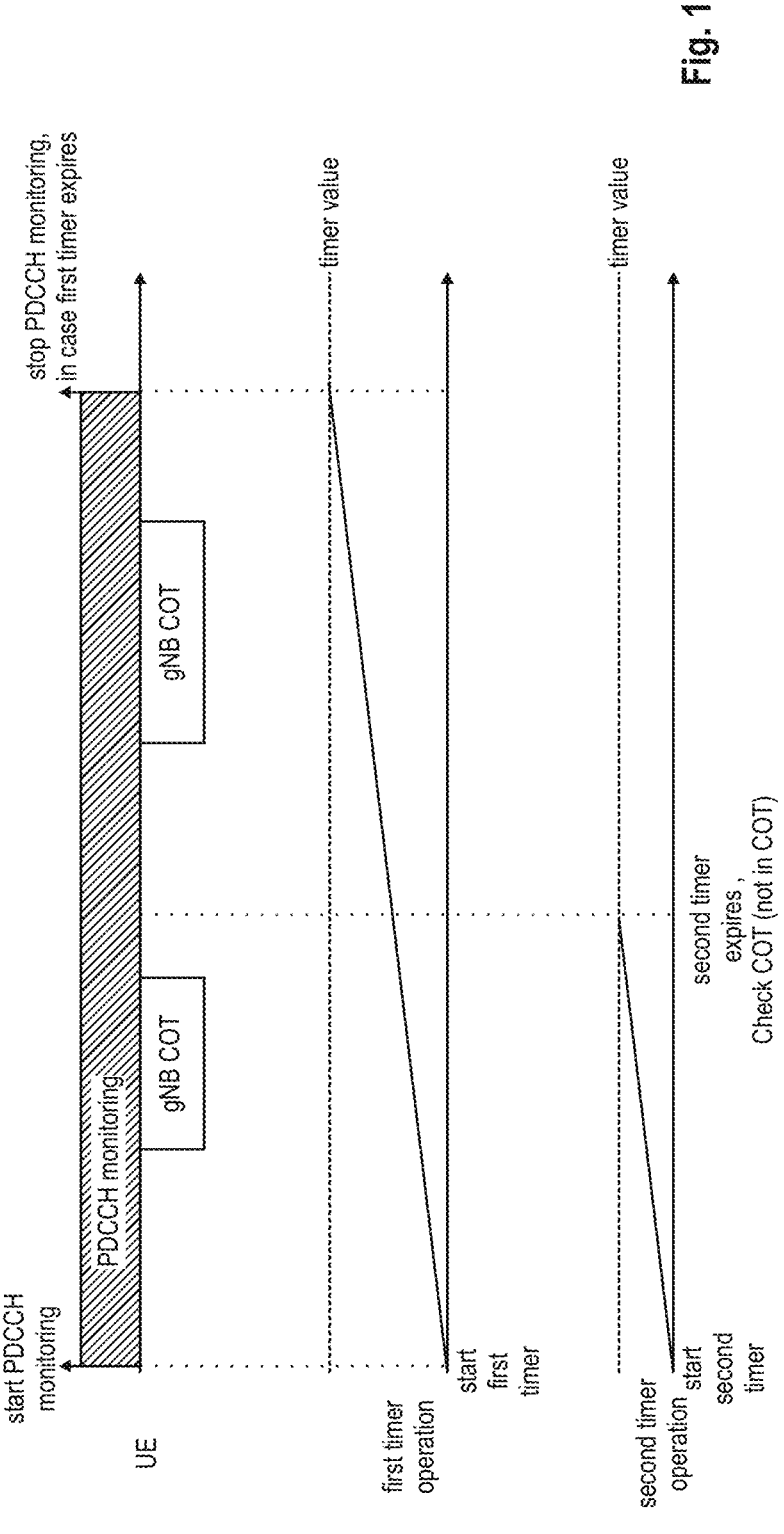
FIG. 16 illustrates the parallel operation of the first and second timers and the resulting PDCCH monitoring according to the second exemplary implementation of the improved downlink control channel monitoring procedure explained in FIG. 14.

FIGS. 15 and 16 illustrate the improved downlink control channel monitoring procedure according to the second alternative presented above with reference to FIG. 14 in two exemplary scenarios. FIGS. 15 and 16 are similar to FIG. 13 in that they illustrate at the top when the downlink control channel (here the PDCCH) is monitored as well as the channel occupation by the gNB (termed gNB COT). In the middle of the figures the operation of the first timer is illustrated, and at the bottom the operation of the second timer. Horizontal dashed lines indicate the timer value of the respective timers, where the timer value of the second timer is significantly lower than the timer value for the first timer. When a timer reaches the respective timer value (horizontal line), it expires.

In FIG. 15, it is exemplarily assumed that the second timer expires during a gNB COT, whereas in FIG. 16 it is exemplarily assumed that the second timer expires outside a gNB COT. As apparent from FIG. 15, the expiry of the second timer leads the UE to check the COT status and thus to determine that the gNB has currently occupied the unlicensed spectrum. The UE continues to monitor the downlink control channel until the end of the current (the first one in the exemplary scenario) COT, and then stops the monitoring, thus allowing the UE to save power.

On the other hand, as apparent from FIG. 16, the expiry of the second timer leads the UE to check the COT status and thus to determine that the gNB has currently not occupied the unlicensed spectrum. The UE thus continues with the monitoring of the downlink control channel until the first timer expires.

In specific variants of the above-described improved monitoring procedure of FIG. 11-16 can be implemented in the LTE and 5G NR environments as standardized at present and in the future. In the above discussion, specific LTE and 5G NR functions were presented that involve the monitoring of a downlink control channel (in particular the PDCCH) and thus would benefit from the improved monitoring procedure. Some of the different functions and how the improved monitoring procedure can be implemented in them will be explained in the following in detail.

The PDCCH is monitored as part of the paging function in order to be able to receive a paging message transmitted by the base station to the UE. When implementing the improved PDCCH monitoring procedure in the paging function, the first timer can be the timer that counts the length of the paging occasion (see TS 38.304 v15.3.0 sections 6.1 and 7.1; TS 38.300 v15.5.0 section 9.2.5). In one exemplary implementation, the first timer value can be increased to cover an extended paging occasion (with a greater length) or cover more than one paging occasion (e.g., summing the length of multiple POs), due to the operation in the unlicensed frequency spectrum of an unlicensed radio cell. The second timer is then a new timer for the paging function to be used when operating in an unlicensed radio cell. The timer value for the second timer can, e.g., be the timer value corresponding to a paging occasion to be monitored by the UE when in a licensed scenario.

A thus configured paging function is then operated by the UE. The PDCCH monitoring is started at the beginning of the paging occasion, at which time (at least) the first PO timer is started by the UE. The second PO timer is operated according to one of the various implementations explained in connection with FIG. 11 to 16. Correspondingly, the second timer is started after the PO PDCCH monitoring starts, particularly with the beginning of the gNB COT, then accumulates the PDCCH monitoring time during the remaining gNB COT (and possibly further gNB COT), and upon its expiry triggers the UE to stop the monitoring of the PDCCH (see FIGS. 12 and 13). Alternatively, the second timer is started at the same time as the first timer with the beginning of the PDCCH monitoring (see FIG. 14-16), and upon its expiry, the UE is triggered to check the COT status to decide whether to continue monitoring until the end of the COT (when determining that the gNB has currently acquired the unlicensed spectrum) or to continue monitoring the PDCCH until the expiry of the first timer (e.g., the end of the paging occasion). Optionally, in line with the current definition of the paging function, the UE, upon expiry of the first and/or second timer may go into the idle-DRX off state.

When the paging message is received while monitoring the PDCCH (e.g., PDCCH with P-RNTI is received and the corresponding PDSCH), there is also no need any more for the UE to continue monitoring the PDCCH for the paging function and the UE can stop monitoring the PDCCH until the next paging interval (unless it is required, e.g., as part of another function). Further, the two timers can be stopped.

The second PO timer allows the UE to stop the PDCCH monitoring earlier (especially when the unlicensed channel is free and the gNB is able to acquire the unlicensed channel). Thus, the UE can save significant power.

Moreover, the PDCCH is to be monitored as part of the system information acquisition function in order to be able to receive system information. When implementing the improved PDCCH monitoring procedure in the system information acquisition function, the first timer can be the timer that counts the length of the system information window (see TS 38.331 v15.5.1 section 5.2; TS 38.300 v 15.5.0 section 7.3, TS 38.213 section 13). In one exemplary implementation, the first timer value can be increased to cover an extended system information window (with a greater length) or to cover more than one SI windows (e.g., summing the length of the multiple SI windows), due to the operation in the unlicensed frequency spectrum of an unlicensed radio cell. The second timer is then a new timer for the SI acquisition function to be used when operating in an unlicensed radio cell. The timer value for the second timer can, e.g., be the timer value corresponding to the SI window to be monitored by the UE when in a licensed scenario.

A thus configured system information acquisition function is then operated by the UE. The PDCCH monitoring is started at the beginning of the SI window, at which time (at least) the first SI window timer is started by the UE. The second SI window timer is operated according to one of the various implementations explained in connection with FIG. 11 to 16. Correspondingly, the second SI window timer is started after the SI window PDCCH monitoring starts, particularly with the beginning of the gNB COT, then accumulates the PDCCH monitoring time during the remaining gNB COT (and possibly further gNB COTs), and upon its expiry triggers the UE to stop monitoring the PDCCH (see FIGS. 12 and 13). Alternatively, the second timer is started at the same time of the first timer with the beginning of the PDCCH monitoring (see FIG. 14-16), and upon its expiry, the UE is triggered to check the COT status to decide whether to continue monitoring until the end of the COT (when determining that the gNB has currently acquired the unlicensed spectrum) or to continue monitoring the PDCCH until the expiry of the first timer (e.g., the end of the SI window). Further, when the SI message is not received successfully and the PDCCH monitoring is stopped, the UE may restart the system information acquisition in the next SI period.

When the system information message is received while monitoring the PDCCH (e.g., the PDCCH with the SI-RNTI and the corresponding PDSCH), there is no need for the UE to any more continue monitoring the PDCCH for the SI acquisition function, and the UE can stop monitoring the PDCCH until the next time new system information has to be received (unless it is required, e.g., as part of another function). Further, the two timers can be stopped.

The second SI window timer thus allows the UE to stop the PDCCH monitoring earlier (especially when the unlicensed channel is free and the gNB is able to acquire the unlicensed channel). Thus, the UE can save significant power.

Moreover, the PDCCH is to be monitored as part of the On-Duration period of the DRX function in order to be check whether any information destined for the UE is received and whether to determine to enter the DRX off state or not. When implementing the improved PDCCH monitoring procedure in the DRX function, the first timer can be the timer that counts the length of the On-Duration period (On-Duration timer; sec TS 38.321 v15.5.0, section 5.7). In one exemplary implementation, the first timer value can be increased to cover an extended On-Duration (with a greater length), due to the operation in the unlicensed frequency spectrum of an unlicensed radio cell. The second timer is then a new timer for the On-Duration operation to be used when operating in an unlicensed radio cell. The timer value for the second timer can, e.g., be the timer value corresponding to the On-Duration period to be monitored by the UE when in a licensed scenario.

A thus configured operation of the DRX On-Duration is then performed by the UE. The PDCCH monitoring is started at the beginning of the DRX On-Duration period, at which time (at least) the first On-Duration timer is started by the UE. The second On-Duration timer is operated according to the various implementations explained in connection with FIG. 11 to 16. Correspondingly, the second On-Duration timer is started after the On-Duration PDCCH monitoring starts, particularly with the beginning of the gNB COT, then accumulates the PDCCH monitoring during the remaining gNB COT (and possibly further gNB COTs), and upon its expiry triggers the UE to stop monitoring the PDCCH (see FIGS. 12 and 13). Alternatively, the second On-Duration timer is started at the same time of the first On-Duration timer with the beginning of the PDCCH monitoring (see FIG. 14 to 16), and upon its expiry, the UE is triggered to check the COT status to decide whether to continue monitoring until the end of the COT (when determining that the gNB has currently acquired the unlicensed spectrum) or to continue monitoring the PDCCH until the expiry of the first timer (e.g., the end of the On-Duration period). Further, when no PDCCH for the UE is received and the PDCCH monitoring is stopped based on the first or second On-Duration timers, the UE may enter into a DRX-off state.

On the other hand, when a PDCCH for the UE is received while monitoring the PDCCH (e.g., a downlink grant or uplink grant), there is no need any more for the UE to continue monitoring the PDCCH based on the On-Duration configuration (e.g., the UE proceed with processing the downlink grant or uplink grant and then move to the next PDCCH monitoring stage). Moreover, in line with the current DRX definition, the UE may monitor the PDCCH as part of the DRX Inactivity timer operation, as will be explained in connection with the next function.

The second On-Duration timer thus allows the UE to stop the On-Duration PDCCH monitoring carlier (especially when the unlicensed channel is free and the gNB is able to acquire the unlicensed channel). Thus, the UE can save significant power.

Moreover, the PDCCH is to be monitored as part of the inactivity timer of the DRX function in order to check whether any information destined for the UE is received and whether the UE is to enter the DRX cycle (due to a prolonged inactivity; see TS 38.321 v15.5.0, section 5.7). When implementing the improved PDCCH monitoring procedure in the DRX function, the first timer can be the DRX inactivity timer that counts the length of the inactivity. In one exemplary implementation, the first timer value can be increased to cover an extended inactivity period (with a greater length), due to the operation in the unlicensed frequency spectrum of an unlicensed radio cell. The second timer is then a new timer for the Inactivity monitoring to be used when operating in an unlicensed radio cell. The timer value for the second timer can, e.g., be the timer value corresponding to the inactivity timer configured for the UE when in a licensed scenario.

A thus configured operation of the DRX Inactivity function is then performed by the UE. The PDCCH monitoring is started at the beginning of the DRX inactivity period, at which time (at least) the first Inactivity timer is started by the UE. The second inactivity timer is operated according to the various implementations explained in connection with FIG. 11 to 16. Correspondingly, the second inactivity timer is started after the Inactivity PDCCH monitoring starts, particularly with the beginning of the gNB COT, then accumulates the PDCCH monitoring during the remaining gNB COT (and possibly further gNB COTs), and upon its expiry triggers the UE to stop monitoring the PDCCH (see FIGS. 12 and 13). Alternatively, the second Inactivity timer is started at the same time of the first inactivity timer with the beginning of the PDCCH monitoring (see FIG. 14 to 16), and upon its expiry, the UE is triggered to check the COT status to decide whether to continue monitoring until the end of the COT (when determining that the gNB has currently acquired the unlicensed spectrum) or to continue monitoring the PDCCH until the expiry of the first timer (e.g., the end of the inactivity period). Further, when no PDCCH is received for the UE and the PDCCH monitoring is stopped based on the first or second Inactivity timers, the UE may then enter the short DRX cycle if so configured.

On the other hand, when a PDCCH for the UE is received while monitoring the PDCCH (e.g., a downlink grant or uplink grant), the UE restarts the first and second Inactivity timers accordingly and continues to monitor the PDCCH.

The second Inactivity timer thus allows the UE to stop the Inactivity PDCCH monitoring earlier (especially when the unlicensed channel is free and the gNB is able to acquire the unlicensed channel). Thus, the UE can save significant power.

Moreover, the PDCCH is to be monitored as part of the random access function in order to check whether a random access response message is received from the gNB in response to the RACH preamble sent by the UE to the gNB earlier. When implementing the improved PDCCH monitoring procedure in the random access function, the first timer can be the timer to count the length of the Random Access Response (RAR) window (e.g., ra-ResponseWindow; see TS 38.321 v15.5.0 section 5.1). In one exemplary implementation, the first timer value can be increased to cover an extended RAR window (with a greater length), due to the operation in the unlicensed frequency spectrum of an unlicensed radio cell. The second timer is then a new timer for the RAR monitoring to be used when operating in an unlicensed radio cell. The timer value for the second timer can, e.g., be the timer value corresponding to the RAR window size configured for the UE when in a licensed scenario.

A thus configured operation of the random access function is then performed by the UE. The PDCCH monitoring is started at the beginning of the RAR window, at which time (at least) the first Inactivity timer is started by the UE. The second RAR window timer is operated according to the various implementations explained in connection with FIG. 11 to 16. Correspondingly, the second RAR window timer is started after the RAR window monitoring starts, particularly with the beginning of the gNB COT, then accumulates the PDCCH monitoring during the remaining gNB COT (and possibly further gNB COTs), and upon its expiry triggers the UE to stop monitoring the PDCCH (see FIGS. 12 and 13). Alternatively, the second RAR window timer is started at the same time of the first RAR window timer with the beginning of the PDCCH monitoring (see FIG. 14 to 16), and upon its expiry, the UE is triggered to check the COT status to decide whether to continue monitoring until the end of the COT (when determining that the gNB has currently acquired the unlicensed spectrum) or to continue monitoring the PDCCH until the expiry of the first timer (e.g., the end of the RAR window). Further, when no random access response is received for the UE and the PDCCH monitoring is stopped based on the first or second RAR window timers, the UE may then proceed to the next step in the RACH procedure (e.g., retransmitting the RACH preamble).

On the other hand, when the RAR is received while monitoring the PDCCH, the UE continues with the random access (e.g., with the msg 3).

The second RAR window timer thus allows the UE to stop the RAR monitoring earlier (especially when the unlicensed channel is free and the gNB is able to acquire the unlicensed channel). Thus, the UE can save significant power. Further, since the next step of the random access can be started earlier, the improved PDCCH monitoring allows to reduce the random access latency.

Moreover, the PDCCH is to be monitored as part of the PDCP reordering function in order to check whether missing PDUs are received so as to be able to provide in-sequence data packets to higher layers. When implementing the improved PDCCH monitoring procedure in the PDCP reordering function, the first timer can be the reordering timer counting the length of the PDCP reordering window (e.g., t-Reordering timer; see TS 38.323 v15.5.0, sections 5.1.2, 5.2.1, 5.2.2). In one exemplary implementation, the first timer value can be increased to cover an extended PDCP reordering window (with a greater length), due to the operation in the unlicensed frequency spectrum of an unlicensed radio cell. The second timer is then a new timer for the PDCP reordering window to be used when operating in an unlicensed radio cell. The timer value for the second timer can, e.g., be the timer value corresponding to the PDCP reordering window configured for the UE when in a licensed scenario.

A thus configured operation of the PDCP reordering function is then performed by the UE. The PDCCH monitoring is started at the beginning of the PDCP reordering window, at which time (at least) the first reordering timer is started by the UE. The second reordering timer is operated according to the various implementations explained in connection with FIG. 11 to 16. Correspondingly, the second reordering timer is started after the reordering window monitoring starts, particularly with the beginning of the gNB COT, then accumulates the PDCCH monitoring during the remaining gNB COT (and possibly further gNB COTs), and upon its expiry triggers the UE to stop monitoring the PDCCH (see FIGS. 12 and 13). Alternatively, the second reordering window timer is started at the same time of the first reordering window timer with the beginning of the PDCCH monitoring (see FIG. 14 to 16), and upon its expiry, the UE is triggered to check the COT status to decide whether to continue monitoring until the end of the COT (when determining that the gNB has currently acquired the unlicensed spectrum) or to continue monitoring the PDCCH until the expiry of the first timer (e.g., the end of the reordering window). Further, when the missing data packets (those packet to allow in-sequence delivery to upper layers) are not received and the PDCCH monitoring is stopped based on the first or second reordering window timers, the UE may then proceed to the next step of the PDCP data exchange (e.g., transmitting a PDCP status report to the gNB to request retransmission of the missing PDUs).

On the other hand, when the missing data packet(s) are received while monitoring the PDCCH, the UE stops the PDCCH monitoring for the reordering function (e.g., all packets are in-sequence and no reordering is currently needed) until the next time that reordering is needed. Further, the UE may proceed to deliver the in-sequence data packets to the higher layers. The second reordering window timer thus allows the UE to stop the reordering monitoring earlier (especially when the unlicensed channel is free and the gNB is able to acquire the unlicensed channel). Thus, the UE can save significant power. Further, since the next step of the reordering function can be performed earlier (e.g., PDCP status report), the improved PDCCH monitoring allows to reduce the latency of the PDCP protocol operation (less latency of the data reception, due to early retransmission).

The above description of the improved downlink control channel monitoring was focusing on the UE side. However, the improved downlink control channel monitoring is also applicable to the gNB side. The different functions described above involve the monitoring of the PDCCH, while from the gNB perspective the various functions involve transmitting information on the PDCCH. In particular, whereas the UE is to monitor the PDCCH as part of a particular function, the converse operation by the gNB is to transmit the corresponding information on the PDCCH to the UE. Therefore, the gNB might perform the same or similar parallel operation of the two timers in order to determine when the UE monitors the downlink control channel so as to determine when to transmit the information to the UE via the downlink control channel. For instance, the gNB may perform a transmission to the UE on the PDCCH only when it has determined that the UE indeed monitors the PDCCH at that point of time; otherwise, the PDCCH transmission is not needed, since the UE does not monitor the PDCCH and would not receive the PDCCH transmission anyway. Correspondingly, the various implementations and variants explained above in connection with FIG. 11-16 can be applied correspondingly to the gNB operation.

For instance, according to one exemplary implementation, the base station determines when the UE monitors the PDCCH based on the operation of the first and second timers as explained for FIG. 11, or based on the first implementation explained in connection with FIGS. 12 and 13, or based on the second implementation explained in connection with FIGS. 14, 15, and 16.

Moreover, the base station is also responsible for configuring the various functions in the UE, including the first and the second timers and their timer values. In said respect, the gNB can transmit appropriate configuration using messages of the RRC protocol.

Further Aspects

According to a first aspect, a UE is provided which comprises processing circuitry, which operates a function that involves monitoring of a downlink control channel of an unlicensed radio cell for information intended to the UE, the unlicensed radio cell operating in an unlicensed spectrum and being controlled by a base station that is in communication with the user equipment. The processing circuitry and a receiver of the UE perform the monitoring of the downlink control channel based on a first timer and a second timer operated in parallel. The first timer is used to limit the maximum time the downlink control channel is to be monitored, by starting the first timer at the beginning of the monitoring of the downlink control channel and stopping the monitoring of the downlink control channel upon expiry of the first timer. The second timer is used to stop the monitoring of the downlink control channel earlier than the first timer depending on the channel occupation status of the unlicensed spectrum of the radio cell by the base station.

According to a second aspect provided in addition to the first aspect, the second timer is operated to accumulate the time the downlink control channel is being monitored during a time where the unlicensed spectrum is occupied by the base station. In an optional implementation thereof, the second timer runs during the time where the unlicensed spectrum is occupied by the base station. In a further optional implementation thereof, the monitoring of the downlink control channel is performed while any of the two timers are running, and wherein upon expiry of either of the first and second timers, the monitoring of the downlink control channel is stopped. In a further optional implementation, the second timer is started when the base station occupies the unlicensed spectrum for the first time after start of the first timer, the second timer is paused when the base station does not occupy the unlicensed spectrum, and the second timer is resumed when the base station occupies again the unlicensed spectrum.

According to a third aspect provided in addition to the second aspect, the function is a paging message monitoring function, wherein the downlink control channel is monitored for receiving a paging message. Upon receiving the paging message, the first timer, the second timer and the monitoring of the downlink control channel for the paging message monitoring function are stopped until a next paging interval. In an optional implementation thereof, the first timer counts the length of one or more paging occasions, and the second timer counts the length of the one or more paging occasions during the time where the unlicensed spectrum is occupied by the base station.

Additionally or alternatively, the function is a system information acquisition function, wherein the downlink control channel is monitored for receiving a system information message. Upon receiving the system information message, the first timer, the second timer and the monitoring of the downlink control channel for the system information acquisition function are stopped until a next time the UE needs to acquire the system information. In an optional implementation thereof, the first timer counts the length of one or more system information acquisition windows, and the second timer counts the length of one or more system information acquisition windows during the time where the unlicensed spectrum is occupied by the base station.

Additionally or alternatively, the function is a signaling monitoring operation for a Discontinued Reception, DRX, function, wherein the downlink control channel is monitored for any downlink control information on the downlink control channel directed to the user equipment. Upon receiving said downlink control information, the first timer and the second timer are stopped and the monitoring of the downlink control channel is continued. In an optional implementation thereof, the first timer counts a length of a DRX On duration and the second timer counts a length of the DRX On Duration during the time where the unlicensed spectrum is occupied by the base station.

Additionally or alternatively, the function is an inactivity monitoring operation for a Discontinued Reception, DRX, function, wherein the downlink control channel is monitored for any downlink control information on the downlink control channel directed to the user equipment. Upon receiving said downlink control information, the first timer and the second timer are restarted and the monitoring of the downlink control channel is continued. In an optional implementation thereof, the first timer counts a length of DRX inactive duration, and the second timer counts a length of the DRX inactive duration during the time where the unlicensed spectrum is occupied by the base station.

Additionally or alternatively, the function is a random access response reception for a random access function, wherein the downlink control channel is monitored for a random access response message transmitted by the base station in response to a random access preamble transmitted before by the user equipment to the base station. Upon receiving said random access response, the first timer and the second timer are stopped and the next step of the random access function is performed. In an optional implementation thereof, the first timer counts the length of the random access response window, and the second timer counts the length of the random access response window during the time where the unlicensed spectrum is occupied by the base station.

Additionally or alternatively, the function is a reordering function of a Packet Data Convergence Protocol, PDPC, layer, wherein the downlink control channel is monitored for missing out-of-sequence data directed to the user equipment. Upon receiving said missing out-of-sequence data, the first timer and the second timer are stopped until the next step when out-of-sequence delivery of data is detected and the monitoring of the downlink control channel is continued. In an optional implementation thereof, the first timer counts the length of the reordering time window, and the second timer counts the length of the reordering time window during the time where the unlicensed spectrum is occupied by the base station.

According to a fourth aspect provided in addition to the first aspect, upon expiry of the second timer, the processing circuitry determines whether the base station has currently occupied the unlicensed spectrum. When the base station has currently occupied the unlicensed spectrum, the monitoring is stopped at the end of the current channel occupation of the unlicensed spectrum and optionally the first timer is stopped. When the base station has not currently occupied the unlicensed spectrum, the monitoring is performed until expiry of the first timer. In an optional implementation, the second timer is started at the same time when the first timer is started.

According to a fifth aspect, provided in addition to the fourth aspect, the function is a paging message monitoring function, wherein the downlink control channel is monitored for receiving a paging message. Upon receiving the paging message, the first timer, the second timer and the monitoring of the downlink control channel for the paging message monitoring function are stopped until a next paging interval. In an optional implementation thereof, the first and second timer count the length of one or more paging occasions.

Additionally or alternatively, the function is a system information acquisition function, wherein the downlink control channel is monitored for receiving a system information message. Upon receiving the system information message, the first timer, the second timer and the monitoring of the downlink control channel for the system information acquisition function are stopped until a next time the UE needs to acquire the system information. In an optional implementation thereof, the first and second timer count the length of one or more system information acquisition windows.

Additionally or alternatively, the function is a signaling monitoring operation for a Discontinued Reception, DRX, function, wherein the downlink control channel is monitored for any downlink control information on the downlink control channel directed to the user equipment. Upon receiving said downlink control information, the first timer and the second timer are stopped, the monitoring of the downlink control channel is continued and optionally a timer for a DRX inactive duration is started. In an optional implementation thereof, the first and second timer count a length of a DRX On duration.

Additionally or alternatively, the function is an inactivity monitoring operation for a Discontinued Reception, DRX, function, wherein the downlink control channel is monitored for any downlink control information on the downlink control channel directed to the user equipment. Upon receiving said downlink control information, the first timer and the second timer are restarted and the monitoring of the downlink control channel is continued. In an optional implementation thereof, the first and second timer count a length of DRX inactive duration.

Additionally or alternatively, the function is a random access response reception for a random access function, wherein the downlink control channel is monitored for a random access response message transmitted by the base station in response to a random access preamble transmitted before by the user equipment to the base station. Upon receiving said random access response, the first timer and the second timer are stopped and the next step of the random access function is performed. In an optional implementation thereof, the first and second timer count the length of the random access response window.

Additionally or alternatively, the function is a reordering function of a Packet Data Convergence Protocol, PDPC, layer, wherein the downlink control channel is monitored for missing out-of-sequence data directed to the user equipment. Upon receiving said missing out-of-sequence data, the first timer and the second timer are stopped until the next time when out-of-sequence delivery of data is detected and the monitoring of the downlink control channel is continued. In an optional implementation thereof, the first and the second timer count the length of the reordering time window.

According to a sixth aspect, provided in addition to one of the first to fifth aspects, the processing circuitry determines the channel occupation by a base station based on a channel occupation signal received by the receiver from the base station. In an optional implementation thereof, the channel occupation signal is transmitted by the base station when the base station occupies the unlicensed spectrum and is not transmitted by the base station when the base station does not occupy the unlicensed spectrum. In an optional implementation thereof, the channel occupation signal indicates an occupation length of the unlicensed spectrum by the base station.

According to a seventh aspect provided in addition to one of the first to the sixth aspects, the receiver receives configuration information from the base station, configuring a first timer value for the first timer. The processing circuitry determines a second timer value for the second timer based on a fraction of the timer value for the first timer. In an optional implementation thereof, the fraction is determined based on the received configuration information, In a further optional implementation thereof, the same fraction is used for determine the second timer value of the second timer for one or more of the operated functions mentioned below (e.g., a paging message monitoring function, system information acquisition function, signaling monitoring operation for a Discontinued Reception, DRX, function, inactivity monitoring operation for a Discontinued Reception, DRX, function, random access response reception for a random access function, and reordering function of a Packet Data Convergence Protocol, PDCP, layer,). Alternatively, the receiver receives configuration information from the base station, configuring a first timer value for the first timer and a second timer value for the second timer.

In an optional implementation of the two alternatives, the second timer value for the second timer is smaller than the first timer value for the first timer, In a further optional implementation of the two alternatives, the configuration information is received using a Radio Resource Control, RRC, protocol message.

According to an eighth aspect provided in addition to one of the first to seventh aspects, the operated function is one of the following functions operated by the user equipment:

a paging message monitoring function, a system information acquisition function, signaling monitoring operation for a Discontinued Reception, DRX, function, inactivity monitoring operation for a Discontinued Reception, DRX, function, random access response reception for a random access function, and reordering function of a Packet Data Convergence Protocol, PDCP, layer.

In an optional implementation of the above, the UE operates one or more of the above functions, and each of the operated function separately involves the monitoring of the downlink control channel and the operation of the first timer and the second timer according to one of the above first to seventh aspects.

According to a ninth aspect provided in addition to one of the first to eighth aspects, a first timer value for the first timer and a second timer value for the second timer are configured for operation of the function in an unlicensed radio cell. A different first timer value for the first timer is configured for operation of the function in a licensed radio cell. The different first timer value in the licensed radio cell is smaller than the first timer value in the unlicensed radio cell. In an optional implementation, the second timer value for the second timer is the same as the first timer value for the first timer configured for operation in a licensed radio cell.

According to a tenth aspect, a base station is provided comprising processing circuitry, which operates a function that involves transmitting information to a user equipment, UE, via a downlink control channel of an unlicensed radio cell that is monitored by the UE for the information intended to the UE. The unlicensed radio cell operates in an unlicensed spectrum and is controlled by the base station that is in communication with the user equipment. The processing circuitry determines when the UE monitors the downlink control channel based on a first timer and a second timer operated in parallel for determining when to transmit the information to the UE via the downlink control channel. The first timer is used to limit the maximum time the downlink control channel is to be monitored by the UE, by starting the first timer at the beginning of the monitoring of the downlink control channel and stopping the monitoring of the downlink control channel upon expiry of the first timer. The second timer is used to stop the monitoring of the downlink control channel earlier than the first timer depending on the channel occupation status of the unlicensed spectrum of the radio cell by the base station. A transmitter of the base station transmits the information to the UE on the downlink control channel based on the previous determination based on the first and second timers.

According to an eleventh aspect, provided in addition to the tenth aspect, the transmitter transmits configuration information to the UE, for configuring a first timer value for the first timer. The processing circuitry determines a second timer value for the second timer based on a fraction of the timer value for the first timer. In an optional implementation, the transmitter, when in operation, transmits the configuration information about the fraction to the UE. Alternatively, the transmitter transmits configuration information to the UE, for configuring a first timer value for the first timer and a second timer value for the second timer.

In an optional implementation of the above two alternatives, the second timer value for the second timer is smaller than the first timer value for the first timer. In a further optional implementation for the above two alternatives, the configuration information is transmitted using a Radio Resource Control, RRC, protocol message.

According to a twelfth aspect, a method is provided comprising the following steps performed by a user equipment, UE:

operating a function that involves monitoring of a downlink control channel of an unlicensed radio cell for information intended to the UE, the unlicensed radio cell operating in an unlicensed spectrum and being controlled by a base station that is in communication with the user equipment, performing the monitoring of the downlink control channel based on a first timer and a second timer operated in parallel. The first timer is used to limit the maximum time the downlink control channel is to be monitored, by starting the first timer at the beginning of the monitoring of the downlink control channel and stopping the monitoring of the downlink control channel upon expiry of the first timer. The second timer is used to stop the monitoring of the downlink control channel earlier than the first timer depending on the channel occupation status of the unlicensed spectrum of the radio cell by the base station.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT).

The communication may include exchanging data through, for example, a cellular system, a wireless LAN system, a satellite system, etc., and various combinations thereof.

The communication apparatus may comprise a device such as a controller or a sensor, which is coupled to a communication device performing a function of communication described in the present disclosure. For example, the communication apparatus may comprise a controller or a sensor that generates control signals or data signals, which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A communication system, comprising:
a base station, which, in operation, transmits a downlink control channel, and
a user equipment (UE),
wherein the UE includes:
processing circuitry and a receiver, which, in operation, monitor the downlink control channel of an unlicensed radio cell for information intended to the UE, the unlicensed radio cell operating in an unlicensed spectrum and being controlled by the base station;
wherein the processing circuitry, in operation, controls the monitoring of the downlink control channel based on a first timer and a second timing trigger,
wherein the first timer is used to limit a maximum time the downlink control channel is to be monitored, by starting the first timer at a beginning of the monitoring of the downlink control channel and stopping the monitoring of the downlink control channel upon expiry of the first timer,
wherein the second timing trigger is used to stop the monitoring of the downlink control channel earlier than the first timer depending on a channel occupation status of the unlicensed spectrum of the radio cell by the base station,
wherein, responsive to the second timing trigger, the processing circuitry determines that the base station currently occupies the unlicensed spectrum and stops the monitoring in a current channel occupation of the unlicensed spectrum, wherein the monitoring is performed until the expiry of the first timer in case the base station does not currently occupy the unlicensed spectrum.

2. The communication system according to claim 1, wherein the processing circuitry of the UE, when in operation, controls the monitoring of the downlink control channel for receiving a paging message, and upon receiving the paging message, the first timer and the monitoring of the downlink control channel for the paging message are stopped until a next paging interval.

3. The communication system according to claim 1, wherein the processing circuitry of the UE determines a channel occupation by the base station based on a channel occupation signal received by the receiver from the base station,
wherein the channel occupation signal is transmitted by the base station when the base station occupies the unlicensed spectrum and is not transmitted by the base station when the base station does not occupy the unlicensed spectrum,
wherein the channel occupation signal indicates an occupation length of the unlicensed spectrum by the base station.

4. The communication system according to claim 1, wherein the receiver of the UE, when in operation, receives configuration information from the base station for configuring a first timer value for the first timer.

5. The communication system according to claim 1, wherein the processing circuitry of the UE, when in operation, performs one of the following:
a paging message monitoring,
a system information acquisition,
signaling monitoring operation for a Discontinued Reception (DRX),
inactivity monitoring operation for a Discontinued Reception (DRX), random access response reception for a random access, and reordering a Packet Data Convergence Protocol (PDCP) layer.

6. The communication system according to claim 1, wherein a first timer value for the first timer is configured for operation in the unlicensed radio cell, and wherein a different first timer value for the first timer is configured for operation in a licensed radio cell, wherein the different first timer value in the licensed radio cell is smaller than the first timer value in the unlicensed radio cell.

7. A method performed by a communication system including a base station and a user equipment (UE), the method comprising:

transmitting, by the base station, a downlink control channel;

monitoring, by the UE, the downlink control channel of an unlicensed radio cell for information intended to the UE, the unlicensed radio cell operating in an unlicensed spectrum and being controlled by the base station;

controlling, by the UE, the monitoring of the downlink control channel based on a first timer and a second timing trigger, wherein the first timer is used to limit a maximum time the downlink control channel is to be monitored, by starting the first timer at a beginning of the monitoring of the downlink control channel and stopping the monitoring of the downlink control channel upon expiry of the first timer, wherein the second timing trigger is used to stop the monitoring of the downlink control channel earlier than the first timer depending on a channel occupation status of the unlicensed spectrum of the radio cell by the base station; and responsive to the second timing trigger, determining, by the UE, that the base station currently occupies the unlicensed spectrum and stopping, by the UE, the monitoring in a current channel occupation of the unlicensed spectrum, wherein the monitoring is performed by the UE until the expiry of the first timer in case the base station does not currently occupy the unlicensed spectrum.

* * * * *